United States Patent
Kuroda et al.

(10) Patent No.: US 9,140,831 B2
(45) Date of Patent: Sep. 22, 2015

(54) OPTICAL SHEET, OPTICAL MEMBER, SURFACE LIGHT SOURCE DEVICE, AND LIQUID CRYSTAL DISPLAY DEVICE

(75) Inventors: Takashi Kuroda, Moriya (JP); Keiko Kitano, Musashino (JP); Akinobu Ushiyama, Moriya (JP); Hiroshi Kojima, Kawagoe (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 13/233,325

(22) Filed: Sep. 15, 2011

(65) Prior Publication Data
US 2012/0120344 A1      May 17, 2012

(30) Foreign Application Priority Data

Sep. 16, 2010 (JP) .................. 2010-207691
Dec. 21, 2010 (JP) .................. 2010-284179
Feb. 16, 2011 (JP) .................. 2011-030948

(51) Int. Cl.
*G02F 1/1335* (2006.01)
*G02B 5/04* (2006.01)
(Continued)

(52) U.S. Cl.
CPC .............. *G02B 5/045* (2013.01); *G02B 5/0231* (2013.01); *G02B 5/0278* (2013.01);
(Continued)

(58) Field of Classification Search
CPC .......... G02B 1/105; G02B 1/04; G02B 1/111; G02B 1/11; G02B 1/10; G02B 1/115; G02B 5/30; G02B 5/3083; G02B 5/3025; G02B 5/305; G02B 5/0231; G02B 5/02; G02B 5/0268; G02B 5/3041; G02B 5/045; G02B 2207/121; G02B 6/0053; G02F 1/133528; G02F 1/133502; G02F 1/13363; G02F 1/1333; G02F 1/133504; G02F 2201/50; G02F 2201/38; G02F 2001/133638; G02F 2001/133635; G02F 2001/133607; G02F 2202/022; C08J 5/18; B32B 2457/202; B32B 2307/536; B32B 2307/40; B32B 2307/42; B32B 2307/554; B32B 7/02; C09K 19/02
USPC ........... 349/62, 65, 64, 96, 57, 117, 123, 137, 349/138, 193, 112, 187; 362/97.1, 97.2, 362/339; 428/217, 141, 220, 327; 427/162, 427/163.1; 359/492.01, 489.07
See application file for complete search history.

(56) References Cited

U.S. PATENT DOCUMENTS 5,598,280 A    1/1997   Nishio et al.
5,995,288 A    11/1999  Kashima et al.
(Continued)

FOREIGN PATENT DOCUMENTS

JP    96/10148 A1    4/1996
JP    08-286005 A1   11/1996
(Continued)

OTHER PUBLICATIONS

Japanese Office Action dated Sep. 28, 2012 (with English translation).

*Primary Examiner* — Thoi Duong
(74) *Attorney, Agent, or Firm* — Burr & Brown, PLLC

(57) ABSTRACT

An optical sheet including a body portion, unit optical elements arranged on one surface of the body portion, and an uneven coating having an uneven surface with micro-protrusions, provided on the other surface of the body portion. When the hardness He of the optical element surface Pe and the hardness Hm of the uneven coating surface Pm are evaluated in terms of the pencil hardness measured in accordance with JIS K5600-5-4 (1999) (load: 1000 g; speed: 1 mm/s), the hardness Hm is not less than the hardness He (hardness Hm≥hardness He) and the hardness Hm is preferably not less than F. Further, the hardness He and the hardness Hm preferably satisfy the following relation:

hardness $He+3 \geq$ hardness $Hm \geq$ hardness $He+2$ wherein the expression "He+1" indicates a hardness harder than He by one unit on the pencil hardness scale.

13 Claims, 6 Drawing Sheets

(51) Int. Cl.
 *G02B 5/02* (2006.01)
 *F21V 8/00* (2006.01)
(52) U.S. Cl.
 CPC . *G02B 6/0053* (2013.01); *G02F 2001/133607* (2013.01); *Y10T 428/24355* (2015.01); *Y10T 428/24983* (2015.01)

(56) References Cited

U.S. PATENT DOCUMENTS

| | | | |
|---|---|---|---|
| 6,091,547 | A | 7/2000 | Gardiner et al. |
| 6,147,804 | A | 11/2000 | Kashima et al. |
| 6,333,817 | B1 | 12/2001 | Kashima et al. |
| 2002/0048088 | A1 | 4/2002 | Kashima et al. |
| 2003/0099039 | A1 | 5/2003 | Kashima et al. |
| 2010/0103529 | A1 | 4/2010 | Nakamura et al. |

FOREIGN PATENT DOCUMENTS

| | | | | |
|---|---|---|---|---|
| JP | 10-506500 | A1 | 6/1998 | |
| JP | 01-037801 | A1 | 2/1999 | |
| JP | 11-095013 | A1 | 4/1999 | |
| JP | 11-326607 | * | 11/1999 | ............... G02B 5/02 |
| JP | 3518554 | B2 | 4/2004 | |
| JP | 3913870 | B2 | 5/2007 | |
| JP | 2008-304524 | A1 | 12/2008 | |
| JP | 2009-037204 | | 2/2009 | |

* cited by examiner

OPTICAL SHEET, OPTICAL MEMBER, SURFACE LIGHT SOURCE DEVICE, AND LIQUID CRYSTAL DISPLAY DEVICE

CROSS-REFERENCE TO RELATED APPLICATIONS

This application claims priority to Japanese Patent Application No. 2010-207691, filed on Sep. 16, 2010, to Japanese Patent Application No. 2010-284179, filed on Dec. 21, 2010, and to Japanese Patent Application No. 2011-030948, filed on Feb. 16, 2011, the disclosures of which are incorporated herein by reference in their entirety.

BACKGROUND OF THE INVENTION

1. Field of the Invention

The present invention relates to an optical sheet for changing the travel direction of light, to an optical member and a surface light source device which use the optical sheet, and to a liquid crystal display device which uses the surface light source device. In particular, the present invention relates to an optical sheet having an excellent scratch resistance, and to an optical member, a surface light source device and a liquid crystal display device which use the optical sheet.

2. Description of the Related Art

An optical sheet is known which is disposed on the light exit surface of a backlight source in a transmission type liquid crystal display device and which condenses exiting light and increases the luminance.

For example, JP 3518554B discloses an optical sheet whose back surface, opposite from a prism surface formed by an arrangement of triangular unit prisms as unit optical elements, is roughened by the provision of a large number of void-forming micro-protrusions having a height of not less than the wavelength of source light and not more than 100 μm. Thus, the back surface of the optical sheet, opposite from the prism surface, is not a mere smooth surface but such an uneven surface (rough surface). When a light guide plate is disposed adjacent to the back surface of the optical sheet, the uneven surface can prevent optical adhesion (optical contact) to the light guide plate, thereby effectively preventing non-uniform in-surface distribution of luminance, the formation of an interference pattern, etc., which would be caused by the optical adhesion.

Such an uneven surface with a large number of micro-protrusions can be formed e.g. by a hot embossing method, a molding method (2P method: photopolymer method) using an ultraviolet or electron beam curable resin and a mold, or a coating method which involves applying a coating composition, including a resin solution containing fine particles, onto a surface to produce a coating having unevenness formed by the fine particles. Of these, the coating method has the advantages that a thermoplastic or thermosetting resin can be used as the resin and resin beads or the like can be used as the fine particles, and an uneven surface can be formed at a low cost in a simple manner as compared to other methods.

While an optical sheet having such a rough back surface can prevent optical adhesion, the optical sheet has a problem in that micro-protrusions on the uneven surface, fine particles that have escaped or fallen off from a coating, etc. can scratch the surface of another optical member disposed adjacent to the rough back surface.

In order to prevent scratching on an adjacent optical member, JP 3913870B proposes a technique of using monodispersed spherical beads, whose half-value width in the particle size distribution is not more than 1 μm, as fine particles contained in a coating.

It is also important for an optical sheet not to lower the luminance by its presence. JP 8-286005A proposes an optical sheet having a lens surface on one side and which is provided with a low-refractive index layer on the other surface as a light entrance surface in order to prevent unnecessary reflection of light at the light entrance surface, thereby increasing the front direction luminance.

Even though scratching of another optical member may be improved by the use of monodispersed fine particles in the optical sheet as proposed by JP 3913870B, the problem of scratching on the optical sheet itself has yet to be solved.

The phenomenon where an optical sheet scratches not another optical member but the optical sheet itself firstly occurs when shipping the optical sheet as a product prior to assembling the optical sheet into a surface light source device. Optical sheets are usually produced in the form of a strip-shaped sheet from the viewpoint of productivity, and the strip-shaped sheet is rolled up into a roll. After storing and/or transporting the roll, the roll is cut into sheet pieces of a shape and size according to the intended use upon shipping. Optical sheets, in the form of sheet pieces, are stacked together during storage or transportation. When the optical sheets are in a rolled or stacked state as described above, the front surface (outermost surface) of one optical sheet and the back surface (facing the front surface) of another optical sheet superimposed on the one optical sheet are in contact with each other. The front and back surfaces, in contact with each other, rub against each other e.g. due to vibration during storage or transportation, which causes scratches on the surfaces, or forces fine particles out of one surface, which in turn causes scratches. Such scratching may occur on either one or both of a prism surface and a coating surface opposite from the prism surface (front and back surfaces).

Such scratching on the front and back surfaces which occurs before use of the optical sheets may be avoided by attaching a protective film to the front and back surfaces, and peeling the protective film off the surfaces when assembling each optical sheet into a surface light source device. From the viewpoint of low cost and resource saving, however, it is preferred not to use such a protective film which finally becomes unnecessary.

The phenomenon where an optical sheet scratches not another optical member but the optical sheet itself secondly occurs after assembling the optical sheet e.g. into a surface light source device. For example, the phenomenon can occur when assembling two stacked optical sheets as described e.g. in Japanese Patent Publication No. H1-37801 and Published Japanese Translation No. H10-506500 of International Patent Publication No. WO 96/10148. In general, the two stacked optical sheets each have, in one surface, triangular prisms as unit optical elements arranged in an arrangement direction, and the two optical sheets, facing in the same direction, are stacked together such that the arrangement direction of the unit prisms of one optical sheet is perpendicular to that of the other optical sheet.

In a surface light source device having a stack of optical sheets disposed adjacent to each other, or in an optical device, such as a liquid crystal display device, which uses the surface light source device, scratching on the front and back surfaces of the optical sheets can occur due to vibration even after assembly. This is because an optical device is sometimes subjected to vibration when it is stored or transported as a semifinished product or a commercial product.

Also when an optical sheet is disposed adjacent to and in contact with another optical member other than an optical sheet, such as a light guide plate or a liquid crystal panel, in an optical device, the front or back surface of the optical sheet itself can be scratched due to vibration during storage or transportation of the optical device.

Unit optical elements such as prisms can receive an external force in a relatively wide area and, in addition, do not contain matter that can escape or fall off, such as fine particles. Therefore, it is possible to design unit optical elements so that they can avoid scratching due to an external force by using a flexible and restorable resin as a material for the unit optical elements, as described in JP 2009-37204A. With reference to an uneven coating surface, on the other hand, stress concentrates in a relatively narrow area. In addition, the coating contains fine particles which can escape or fall off. It has therefore been difficult to prevent scratching on such a coating surface even when restoring properties are imparted to the coating.

Besides roughening of a surface of an optical sheet in order to prevent the problem of optical adhesion, it is also possible to deal with the problem by roughening the surface of another optical member which is to make contact with the optical sheet, as described in the above-cited JP 3518554B, paragraph [0015] and FIG. 4. For example, when an optical member which is to make contact with an optical sheet is a light diffusing sheet, the light exit surface (and the light entrance surface) of the light diffusing sheet is roughened.

In this case, it is not necessary to roughen the back surface (coating surface) of the optical sheet, and the smooth back surface can reduce scratching on the adjacent prism surface (front surface) of the light diffusing sheet or the adjacent surface of another optical member. Even if the adjacent prism surface or the adjacent surface of another optical member is scratched, the degree of scratching will be relatively low and will not significantly affect the optical properties.

However, a scratch is fairly noticeable on the back surface of the optical sheet because of the smoothness of the surface. It is highly likely that even a small scratch which does not affect the optical properties will be determined as a defect by visual inspection, or will be deemed to lower the commercial value of the optical sheet. On the other hand, a scratch is hardly noticeable visually on the prism surface of the optical sheet because of the ribbed appearance and the light condensing or diffusing properties of the prism surface. Therefore, such a small scratch as not to affect the optical properties could be allowable.

Thus, even when a back surface, opposite from a prism surface, is a smooth surface, the problem of scratching due to friction between the front and back surfaces of optical sheets remains. Reduction of scratching on the back surface of an optical sheet is of particular importance and must be addressed when no use of the above-described protective film is intended.

A low-refractive index layer, which is provided in an optical sheet from the viewpoint of increasing the luminance, in most cases has a small thickness such as about ¼ of the wavelength of light whose reflection is to be prevented, and is susceptible to scratching due to contact with another optical member. Furthermore, such a low-refractive index layer does not take account of prevention of optical adhesion and prevention of scratching on another optical member and the optical sheet itself. Therefore, scratching on the optical sheet and an adjacent optical member or sheet cannot be prevented.

The provision of a coating on the back side of an optical sheet necessitates a process and a material for the formation of the coating. Thus, from the viewpoint of reduction in the product cost, it is highly desirable if the problem of scratching on an optical sheet can be dealt without provision of a coating.

It is therefore an object of the present invention to provide an optical sheet including an optical element surface, formed by e.g. prisms, and a back surface opposite from the optical element surface, and having excellent scratch resistance.

It is also an object of the present invention to provide a surface light source device and a liquid crystal display device which use the optical sheet and in which optical members, including the optical sheet, are hardly scratched owing to the use of the optical sheet.

SUMMARY OF THE INVENTION

An optical sheet according to the present invention is an optical sheet comprising:
a sheet-like body portion; and
unit optical elements arranged on one surface of the body portion,
wherein the optical sheet has a pair of opposite surfaces,
wherein one of the pair of surfaces is configured as an optical element surface formed by the unit optical elements, and
wherein when a hardness He of the optical element surface and a hardness Hm of a back surface, which is the other one of the pair of surfaces, are evaluated in terms of the pencil hardness measured in accordance with JIS K5600-5-4 (1999) (with a load of 1000 g and at a speed of 1 mm/s), the hardness Hm is not less than the hardness He (hardness Hm≥hardness He).

In the optical sheet according to the present invention, the hardness He and the hardness Hm may satisfy the following relation:

hardness $He+3 \geq$ hardness $Hm \geq$ hardness $He+2$ wherein the expression "+1" indicates a hardness harder by one unit on a pencil hardness scale.

In the optical sheet according to the present invention, the hardness Hm may be not less than F (hardness Hm≥F).

The optical sheet according to the present invention may further comprise a coating provided on the other surface of the body portion; and said back surface may consist of the surface of the coating.

In the optical sheet according to the present invention, the refractive index Nm of the resin of the coating may be lower than the refractive index Ns of the portion of the other surface of the body portion.

In the optical sheet according to the present invention, the surface of the coating may be either an uneven surface having micro-protrusions or a smooth surface.

In the optical sheet according to the present invention, the hardness Hm may be not less than B (hardness Hm≥B).

In the optical sheet according to the present invention, said back surface may consist of the other surface of the body portion.

In the optical sheet according to the present invention, said back surface may be either an uneven surface or a smooth surface.

An optical member according to the present invention comprises two optical sheets, each being any one of the above-described optical sheets according to the present invention, wherein the two optical sheets are stacked together such that they face in the same direction.

A surface light source device according to the present invention comprises a light source and any one of the above-described optical sheets according to the present invention.

A liquid crystal display device according to the present invention comprises any one of the surface light source devices according to the present invention, and a transmission type liquid crystal display panel disposed opposite to the surface light source device.

DETAILED DESCRIPTION OF THE INVENTION

Preferred embodiments of the present invention will now be described with reference to the drawings. The drawings are conceptual ones, and the scales, horizontal to vertical dimensional ratios, etc. of components may be exaggerated.

<[A] Summary>

As shown in FIGS. 1 through 14, an optical sheet 10 according to the present invention has a pair of opposite surfaces Pe, Pm, and comprises a sheet-like body portion 1 and unit optical elements 2 arranged on one surface 1p (upper surface in FIGS. 1 and 8) of the body portion 1. One of the pair of surfaces Pe, Pm of the optical sheet 10 is configured as an optical element surface Pe formed by the unit optical elements 2. The unit optical elements 2 on the body portion 1 are comprised of a large number of unit rod-like prisms having a triangular cross-sectional shape and arranged such that the ridge lines extend parallel to each other.

Figure 1:
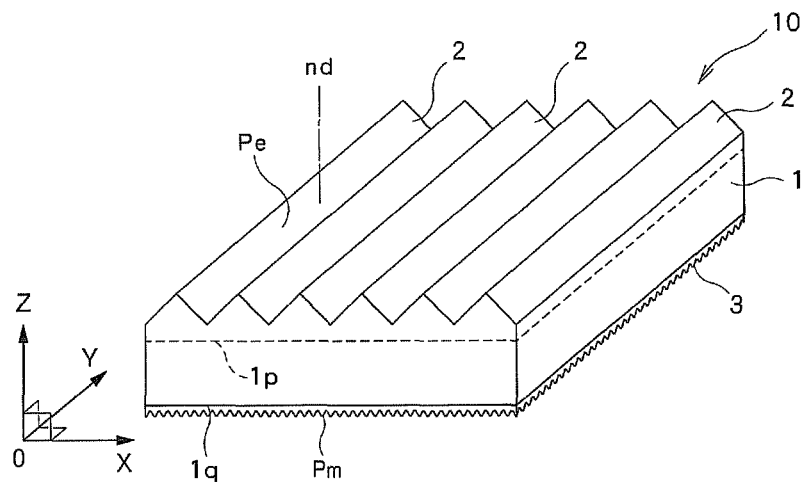
FIG. 1 is a perspective view of an optical sheet according to a first embodiment of the present invention.
Figure 8:
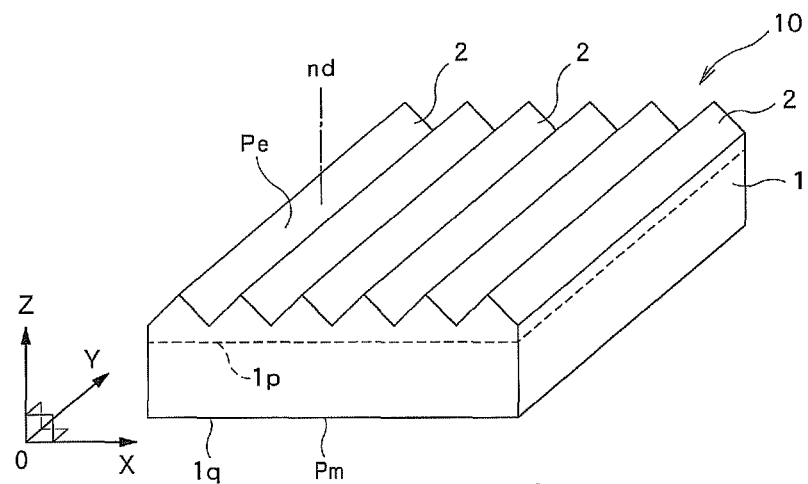
FIG. 8 is a perspective view of an optical sheet according to a second embodiment of the present invention.

In the Cartesian coordinate system used in FIGS. 1 and 8, the X-axis is taken to be parallel to the arrangement direction of the unit optical elements 2 (unit rod-like prisms in this embodiment), the Y-axis is taken to be parallel to the ridge line direction of the unit optical elements 2 (unit rod-like prisms), and the Z-axis is taken to be parallel to the thickness direction of the body portion 1.

In a first embodiment of the present invention, as shown in FIG. 1 and FIGS. 3 through 7, a coating 3 or 4 is formed on the other surface 1q of the body portion 1. The back surface (opposite-side surface) Pm, which is the other one of the pair of surfaces Pe, Pm and is opposite from the optical element surface Pe, of the optical sheet 10 is the surface of the coating 3 or 4. In a second embodiment of the present invention, as shown in FIG. 8 and FIGS. 10 through 14, no coating is formed on the other surface 1q of the body portion 1 and the other surface 1q is exposed. The back surface (opposite-side surface) Pm of the optical sheet 10 is the other surface 1q of the body portion 1.

In the exemplary optical sheet of the first embodiment, shown in FIG. 1, an uneven coating 3 having a rough outermost surface is formed on the other surface 1q of the body portion 1. The uneven coating 3 can be formed, for example, by applying a coating composition, comprising a binder resin and fine particles, onto the body portion. The outermost surface is roughened by the formation of micro-protrusions on the surface due to the presence of the fine particles. In the optical sheet 10, the outermost surface on the side having the unit optical elements 2 is the optical element surface Pe, while the outermost surface (back surface Pm) on the side having the uneven coating 3 is the coating surface.

Figure 3:
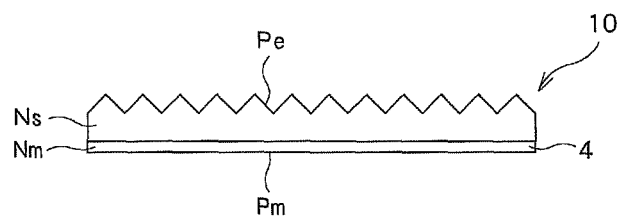
FIG. 3 is a cross-sectional view showing a variation of the optical sheet of FIG. 1.

Instead of the uneven coating 3, it is possible to form a coating 4 having a smooth surface on the other surface 1q of the body portion 1 as in the optical sheet 10 shown in the cross-sectional view of FIG. 3. The coating 3 or 4 has a certain degree of hardness from the viewpoint of scratch resistance, as will be described later. Thus, it can be said that scratch resistance is imparted to the coating 3 or 4. The smooth coating 4, therefore, is herein also referred to as scratch-resistant coating.

In the optical sheet of the first embodiment, the refractive index Nm of the resin of the uneven coating 3 or the smooth coating (scratch-resistant coating) 4 is lower than the refractive index Ns of the coating-facing portion of the sheet-like body portion 1 (the portion including the other surface 1q of the body portion). Accordingly, the provision of the uneven coating 3 or the smooth coating 4 does not lower the luminance but rather can increase it.

In the optical sheet according to the present invention, when the hardness He of the optical element surface Pe and the hardness Hm of the back surface Pm (the coating surface in the first embodiment or the other surface of the body portion in the second embodiment) are evaluated in terms of the pencil hardness measured in accordance with JIS K5600-5-4 (1999) (with a load of 1000 g and at a speed of 1 mm/s), the hardness Hm of the back surface Pm is not less than the hardness He of the optical element surface Pe (hardness Hm≥hardness He). Such pencil hardnesses He, Hm can impart excellent scratch resistance to the optical sheet, making it possible to prevent scratching very effectively especially when such optical sheets are stacked together.

In the optical sheets of the first and second embodiments of the present invention, the hardness He of the optical element surface Pe and the hardness Hm of the back surface Pm (the coating surface in the first embodiment or the other surface of the body portion in the second embodiment) preferably satisfy the following relation:

hardness $He+3 \geq$ hardness $Hm \geq$ hardness $He+2$

This can significantly increase the scratch resistance of the optical sheet, making it possible to prevent scratching very effectively especially when such optical sheets are stacked together. In particular, when two optical sheets are stacked together such that the optical element surface Pe and the back surface Pm are in contact with each other with a strong frictional force acting therebetween, as shown in FIGS. 4, 5, 11 and 12, in the case of hardness Hm−hardness He>3, the optical element surface Pe is too soft as compared to the back surface Pm, and therefore it is possible that the optical element surface Pe may be scratched. In the case of hardness Hm−hardness He<2, on the other hand, the optical element surface Pe is too hard (is brittle) for the back surface Pm, and therefore it is possible that the optical element surface Pe may be scratched, or the back surface Pm may be scratched by the hard optical element surface Pe.

Figure 2:
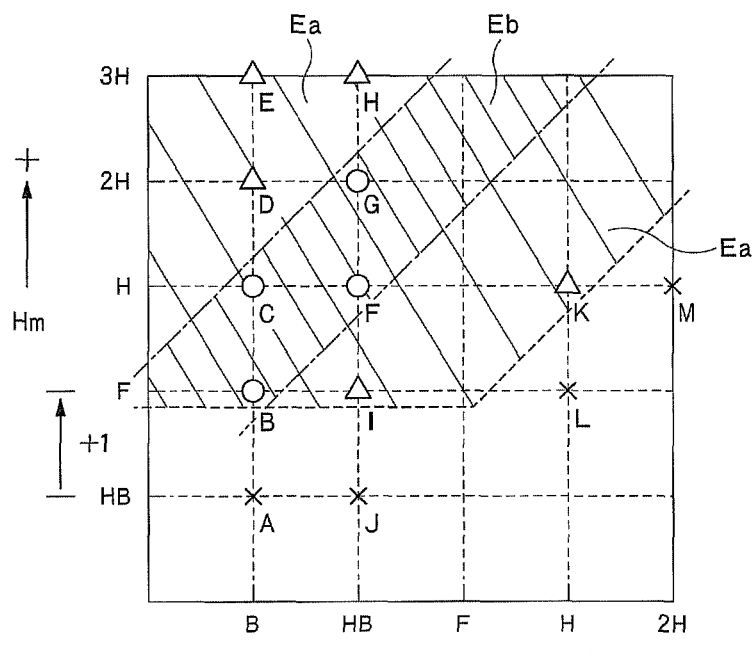
FIG. 2 is a graph illustrating a preferred relationship between the pencil hardnesses of the front and back surfaces of the optical sheet according to the first embodiment.

FIG. 2 is a graph showing a preferred relationship, from the viewpoint of scratch resistance, between the pencil hardness He of the optical element surface Pe and the pencil hardness Hm of the back surface (coating surface) Pm in the optical sheet according to the first embodiment of the present invention. In the graph, the abscissa (X-axis) represents the hardness He of the optical element surface Pe, and the ordinate (Y-axis) represents the hardness Hm of the back surface (coating surface) Pm. An optical sheet whose back surface Pm is configured as a coating surface is generally used in an environment where a certain degree of scratch resistance is required. For such an optical sheet according to the first embodiment, it is preferred to set the hardness He and the hardness Hm within the region Ea shown in FIG. 2, i.e. in such a manner that the hardness Hm is not less than F and the hardness Hm is not less than the hardness He (Hm≥He). This can effectively prevent the optical sheet, especially the back surface (coating surface) Pm, from being scratched. Although no particular lower limit is set for the hardness He of the optical element surface Pe, even when an external force is applied to the optical element surface Pe e.g. by contact with the back surface Pm, the optical element surface Pe will deform in response to the external force and, when released from the external force, will return to its original shape by the elastic restoring force. Scratching on the optical element surface Pe will thus be prevented. However, the hardness He of the optical element surface Pe may generally be set not less than 4B.

Figure 9:
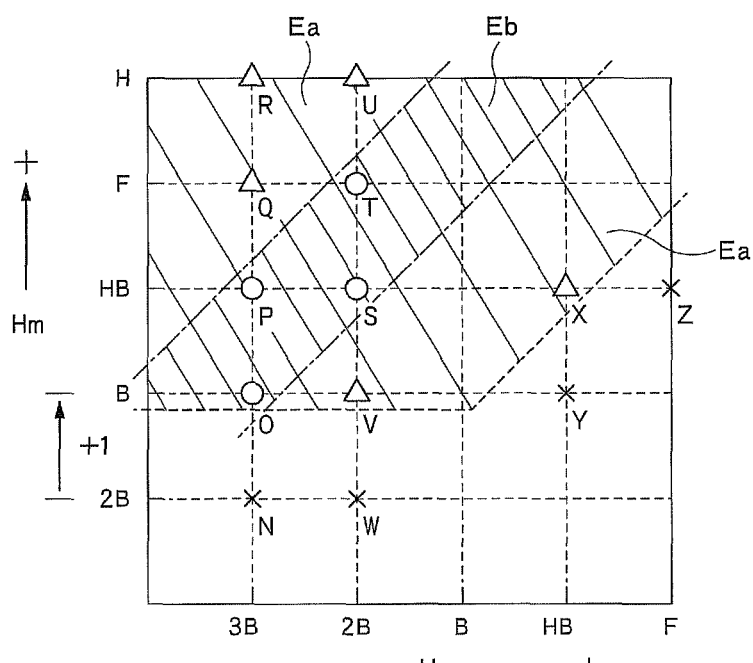
FIG. 9 is a graph illustrating a preferred relationship between the pencil hardnesses of the front and back surfaces of the optical sheet according to the second embodiment.
Figure 10:
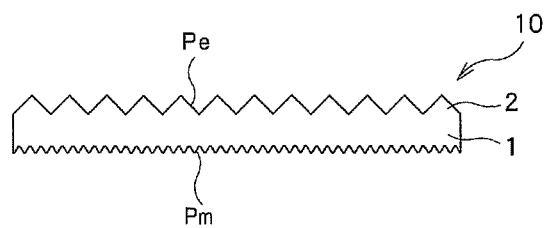
FIG. 10 is a cross-sectional view showing a variation of the optical sheet of FIG. 8.

FIG. 9 is a graph showing a preferred relationship, from the viewpoint of scratch resistance, between the pencil hardness He of the optical element surface Pe and the pencil hardness Hm of the back surface (the other surface of the body portion) Pm in the optical sheet according to the second embodiment of the present invention. In the graph, the abscissa (X-axis) represents the hardness He of the optical element surface Pe, and the ordinate (Y-axis) represents the hardness Hm of the back surface (coating surface) Pm. For the optical sheet according to the second embodiment, it is preferred to set the hardness He and the hardness Hm within the region Ea shown in FIG. 9, i.e. in such a manner that the hardness Hm is not less than B and the hardness Hm is not less than the hardness He (Hm≥He). This can effectively prevent the optical sheet, especially the back surface Pm, from being scratched. Although no particular lower limit is set for the hardness He of the optical element surface Pe, even when an external force is applied to the optical element surface Pe e.g. by contact with the back surface He, the optical element surface Pe will deform in response to the external force and, when released from the external force, will return to its original shape by the elastic restoring force. Scratching on the optical element surface Pe will thus be prevented. However, as with the first embodiment, the hardness He of the optical element surface Pe may generally be set not less than 4B.

<[B] Definitions Of Terms>

The definitions of main terms used herein will now be described.

The "one surface $1p$" of the body portion 1 is the surface of the body portion 1 on the side on which the unit optical elements 2 are arranged. The "one surface $1p$" side of the optical sheet 10 is referred to as "optical element side". When the unit optical elements 2 are arranged without a space between adjacent elements, the "one surface $1p$" is a virtual surface which does not actually exist as an outermost surface or an interface in the body portion 1. When the unit optical elements 2 are arranged with a space between adjacent elements, the "one surface $1p$" includes the actual surface exposed between the unit optical elements 2.

The "other surface $1q$" of the body portion 1 is the surface of the body portion 1 on the side opposite from the side on which the unit optical elements 2 are arranged.

When the one surface $1p$ of the body portion 1 is filled with the unit optical elements 2 arranged without a space between adjacent elements, the "unit element surface Pe" consists solely of the surface of the unit optical elements 2. When the unit optical elements 2 are arranged on the one surface $1p$ with a space between adjacent elements, the "unit element surface Pe" consists of the surface of the unit optical elements 2 and the one surface $1p$ of the body portion 1, exposed between the unit optical elements 2.

When the optical sheet 10 is used in a display device with the "optical element side" as the "light exit side", the "optical element side" is the "viewer side", i.e. the side closer to a viewer who views a displayed image.

The term "front surface" herein refers to the surface of an optical sheet on the side having unit optical elements, and the term "back surface" refers to the surface, opposite from the "front surface", of the optical sheet. The phrase "front and back surfaces" refers to both the "front surface" and the "back surface". When the one surface $1p$ of the body portion 1 is entirely covered with the unit optical elements 2 as is usual with the optical sheet 10, the "front surface" coincides with the "unit element surface Pe". When an optical sheet has a coating, the "back surface" of the optical sheet coincides with the surface of the coating, i.e. the "coating surface". When an optical sheet has no coating, the "back surface" of the optical sheet coincides with the other surface $1q$ of the body portion 1. The terms "front (surface)" and "back (surface)" are not used herein based on the positional or directional relationship with an image viewer, a light source, etc.

The term "surface" refers to a face of a body at which the body makes contact with air. The terms "back surface" and "front surface" both should be construed as such. A "surface" will also be called "outermost surface".

The term "exposed surface" refers to a face of a body at which the body makes contact with air, and thus has the same meaning as "surface".

The phrase "front and back surfaces" may be used herein when describing the relationship between the optical element surface Pe and the back surface Pm.

The phrase "two optical sheets, facing in the same direction, are stacked together" herein refers to a stack of two or more optical sheets $10a, 10b, \ldots$, in which, as shown in FIGS. 4, 5, 11 and 12 (in the case of two optical sheets), the optical element surfaces Pe, Pe, . . . , all face in the same direction (upward in FIGS. 4, 5, 11 and 12), and the optical element surface Pe of one optical sheet $10b$ faces the back surface Pm of an adjacent optical sheet $10a$.

The term "main cross-section" herein refers to a cross-section parallel to the normal nd (see FIG. 1) of the "one surface $1p$" of the body portion 1 and to the arrangement direction of the unit optical elements 2, in other words, a cross-section parallel to the normal nd and perpendicular to the ridge lines of the unit optical elements 2 (unit rod-like prisms). In FIG. 1, the Z-axis is parallel to the normal nd.

The term "smooth" herein refers to smoothness in an optical sense. In particular, the term refers to such a degree of smoothness of a surface of the optical sheet 10 that a certain proportion of visible light is refracted at the surface while satisfying the Snell's law. Thus, a surface will sufficiently meet the definition of "smooth" if the 10-point average roughness Rz (JIS B0601, 1994) of the surface is less than the shortest visible light wavelength (0.38 μm).

The term "uneven surface" herein refers to an irregular or rough surface which does not meet the above definition of "smooth". Thus, a surface (outermost surface) may be regarded as an uneven surface if the 10-point average roughness Rz of the surface is not less than 0.38 μm. In order for an uneven surface to sufficiently exert its optical effects, such as prevention of optical adhesion, diffusion of light, etc. over the entire wavelength range of visible light, the 10-point average roughness Rz of the surface preferably exceeds 0.78 μm, the longest visible light wavelength. The 10-point average roughness Rz of an uneven surface is generally about 1 to 10 μm.

Those terms used herein to specify a shape or geometric conditions, such as "triangle", "circle", "ellipse", "parallel", "perpendicular", "polygonal line", etc., should not be bound to their strict sense, and should be construed to include equivalents or resemblances which may reflect limitations in production technique, a molding error, etc. and from which the same optical function or effect can be expected.

The terms "sheet", "film" and "plate" are not used herein to strictly distinguish them from one another. In particular, a "sheet", a "film" and a "plate" are not distinguished from one another by a specified thickness or rigidity. Thus, an "optical sheet" includes a member which can also be called an optical film or an optical plate.

<[C] Optical Sheet>

The optical sheet of the present invention will now be described. The optical sheet according to the first embodiment, shown in FIGS. 1 through 7, will be described first, and then the optical sheet according to the second embodiment, shown in FIGS. 8 through 14, will be described.

<[C-1] Optical Sheet According to the First Embodiment>

The optical sheet according to the first embodiment, shown in FIGS. 1 through 7, will be described. As described above, the optical sheet 10 according to the first embodiment comprises the body portion 1, the unit optical elements 2 provided on one surface 1p of the body portion 1, and the coating 3 or 4 provided on the other surface 1q of the body portion 1. One of the pair of the main surfaces of the optical sheet 10 is configured as an optical element surface Pe formed by the unit optical elements 2, while the back surface (the other one of the pair of the main surfaces), opposite from the optical element surface Pe, of the optical sheet 10 consists of a coating surface Pm, the surface of the coating 3 or 4. The respective layers of the optical sheet of the first embodiment will now be described in greater detail.

[Body Portion]

Examples of materials usable for the body portion 1 may include a transparent resin material such as a polyester resin, e.g. polyethylene terephthalate or polyethylene naphthalate, an acrylic resin, a polycarbonate resin, a polyolefin resin, etc., and a transparent inorganic material such as glass, ceramics, etc.

The body portion 1 has a "sheet-like shape". The thickness of the body portion 1 is, for example, 25 μm to 5 mm.

From the viewpoint of productivity, the optical sheet preferably has flexibility so that it can be rolled up into a roll. From this viewpoint, it is preferred not to use a so-called plate which is rigid as the body portion 1. In view of the flexibility of the optical sheet, the thickness of the body portion 1 is preferably about 25 μm to 500 μm.

The other surface 1q of the body portion 1, on which the coating 3 or 4 is formed, generally is a smooth surface, though a non-smooth surface is possible.

Both the one surface 1p and the other surface 1q of the body portion 1 generally are flat surfaces. When the body portion 1 is a plate, it has a flat plate-like shape.

[Formation of the Body Portion and the Unit Optical Elements]

That portion of the optical sheet 10 which consists of the body potion 1 and the unit optical elements 2 can be formed by using a known method and a known transparent material. For example, the unit optical elements 2 and the body portion 1 may be formed integrally using the same material by a molding method such as melt extrusion, injection molding, hot press embossing, etc. Alternatively, the unit optical elements 2 can be formed as a distinct layer by a method comprising bringing a resin solution into contact with the body portion 1 in the form of a film or a molded product, and solidifying the resin solution between the body portion 1 and a mold by a chemical (curing) reaction or by cooling, thereby forming the unit optical elements 2 such as prisms on the surface of the body portion 1. For example, the unit optical elements 2 may be produced by a so-called 2P method (photopolymer method) which uses an ionizing radiation curable resin as a resin solution, and cures the resin by ionizing radiation, such as ultraviolet radiation or electron beam radiation. When a transparent substrate, such as a resin sheet, is used for the body portion 1 in this method, a resin layer (land portion) having a small thickness and the unit optical elements 2 lying on the resin layer are formed integrally on the transparent substrate. In this case, the body portion 1 consists of the transparent substrate and the resin layer (land portion).

[Unit Optical Elements]

Though the unit optical elements 2 are typically unit rod-like prisms, it is possible to arbitrarily use other known unit optical elements, such as microlenses (an array of a large number of microlenses is called fly's eye lens).

Unit rod-like prisms will now be described in greater detail.

(Unit Rod-Like Prisms)

Unit rod-like prisms are typically triangular unit prisms each having a triangular shape, whose bottom side lies on the body portion 1, in the main cross-section. However, various types of known prisms may arbitrarily be used as unit rod-like prisms. Examples of the cross-sectional shape of each prism may include a shape composed solely of straight lines, such as a triangle, a quadrangle, a pentagon, a hexagon, etc., a shape partly having a curved portion and a shape solely composed of a curved line (e.g. a part of a curved geometric shape such as a circle, an ellipse, a parabola, a hyperbola, a sine curve, etc.).

Unit rod-like prisms whose cross-sectional shape is a part of a curved geometric shape, such as a circle or an ellipse, can also be called unit rod-like lenses; the term "unit rod-like prisms" herein includes such unit rod-like lenses.

With reference to an array of unit rod-like prism, it is not necessary that all the unit prisms have the same shape and the same size: some unit prisms may differ in the shape or size from the other unit prisms, or the shape or size may differ irregularly among all the unit prisms. The unit rod-like prisms need not necessarily be arranged at regular intervals: some unit prisms may be arranged at intervals different from those of the other unit prisms, or all the unit prisms may be arranged at irregular intervals.

JP 3119471B, JP 2002-504698T, etc. describe an array of unit rod-like prisms in which the height of the ridge line of each unit prism changes in a polygonal line. The unit rod-like prisms are preferred from the viewpoint of solving problems due to optical adhesion, such as light infiltration, the formation of an interference pattern, etc. on the prism surface side. The array of such unit prisms, each having a polygonal ridge line, can be easily produced by means of a cylindrical mold which is commonly used for the production of such prisms. The surface of the mold has been machined with a cutting tool in such a manner that the cutting depth is changed in a polygonal line during machining.

(Exemplary Dimensions of Unit Rod-Like Prisms)

With reference to each unit rod-like prism, the width of the bottom (in the prism arrangement direction) may be, for example, 10 to 500 μm, and the height of the ridge may be, for example, 5 to 250 μm. When the cross-sectional shape of each unit prism is an isosceles triangle, the apex angle at the ridge may be, for example, 80 to 110°, preferably 90°.

When an array of microlenses is used as the unit optical elements 2, as with an array of unit rod-like prisms, it is not necessary that all the microlenses have the same shape and the same size: some microlenses may differ in the shape or size from the other unit prisms, or the shape or size may differ irregularly among all the microlenses. The microlenses need not necessarily be arranged at regular intervals: some microlenses may be arranged at intervals different from those of the other microlenses, or all the microlenses may be arranged at irregular intervals. Each microlens typically has a shape corresponding to a part of a sphere or a spheroid with a circular or ellipsoidal bottom, though it may have some other shape (e.g. a circular cone or a pyramid).

As described above, the unit optical elements 2 are typified by unit rod-like prisms and microlenses. In addition to the use of either unit rod-like prisms (including columnar unit lenses) or microlenses as the unit optical elements 2, the optical sheet 10 of the present invention may use unit rod-like prisms and microlenses in combination as the unit optical elements 2, as disclosed in JP 2010-44379A.

[Uneven Coating]

The uneven coating 3 is a transparent layer which contains at least a binder resin and whose outermost surface, exposed to the outside (surrounding atmosphere), is an uneven surface with unevenness. The uneven coating 3 may either be one containing no fine particles and whose surface unevenness have been formed by means of a mold, or one containing a binder resin and fine particles, and whose surface unevenness are formed by fine particles protruding from the surface. The following description is given of the uneven coating 3 containing fine particles.

The uneven coating 3 of this embodiment can be formed by applying a resin composition (coating solution, coating composition), comprising a binder resin and fine particles as essential components and optionally containing an additive(s), a solvent, etc., onto the surface lq of the body portion 1. The resin composition may contain a solvent so as to cause volume shrinkage of the coating upon its solidification, thereby reducing the thickness of the coating. The thickness reduction causes fine particles to protrude from the surface, thus creating micro-protrusions. The surface of the uneven coating 3, i.e. the coating surface Pm, can thus be formed as an uneven surface. It is also possible to use as the binder resin a resin which cures e.g. by a curing reaction or an addition polymerization reaction so as to cause volume shrinkage of the coating upon curing. Also in this case, the volume shrinkage creates micro-protrusions, formed by fine particles protruding from the coating surface, thus roughening the coating surface.

The surfaces of protruding fine particles may either be covered with the binder resin or not covered with the binder resin, and the coating can be produced in both ways. However, in order to prevent escape of protruding particles from the coating surface, and to further enhance the effect of preventing scratching on the front and back surfaces of an optical sheet, to be achieved by the present invention, the surfaces of protruding fine particles are preferably covered with the binder resin.

Firstly, a transparent resin having strong adhesion to the body portion 1 and to the fine particles is preferably used as the binder resin from the viewpoint of strongly fixing the fine particles in the binder resin matrix and preventing peeling of the uneven coating 3 from the body portion 1.

Such a binder resin may be exemplified by a transparent thermoplastic resin or a transparent curable resin, such as a thermoplastic resin or an ionizing radiation curable resin. Examples of the thermosetting resin include an acrylic resin, a polyester resin, a polyurethane resin, a vinyl chloride-vinyl acetate copolymer, etc. Examples of the thermosetting resin include a thermosetting acrylic resin, a thermosetting polyester resin, a thermosetting polyurethane resin, etc. Examples of the ionizing radiation resin include an acrylic resin, an epoxy resin, a polyester resin, etc. which cures by ionizing radiation such as ultraviolet radiation or electron beam radiation. In the case of a thermosetting resin, the resin composition may contain a curing agent, a polymerization initiator, etc. as part of the resin component.

Of the above-described various binder resins, an ionizing radiation curable resin is preferred because it cures rapidly and thus is excellent in the productivity and, in addition, it can provide an uneven coating 3 having high strength and excellent scratch resistance.

A monomer and/or a prepolymer which polymerizes and cures, e.g. through a crosslinking reaction, by ionizing radiation may be used as the ionizing radiation curable resin.

The monomer may be a radical polymerizable monomer or a cationic polymerizable monomer. Examples of the radical polymerizable monomer include monofunctional (meth) acrylates such as methyl(meth)acrylate, butyl(meth)acrylate, 2-ethylhexyl (meth)acrylate, lauryl(meth)acrylate, isobornyl (meth)acrylate, and dicyclopentenyl(meth)acrylate; and polyfunctional (meth)acrylates such as dipropylene glycol di(meth)acrylate, 1,6-hexanediol di(meth)acrylate, neopentyl glycol di(meth)acrylate, trimethylolpropane tri(meth) acrylate, pentaerythritol tri(meth)acrylate, pentaerythritol tetra(meth)acrylate, dipentaerythritol penta(meth)acrylate, dipentaerythritol tetra(meth)acrylate, and dipentaerythritol hexa(meth)acrylate. The expression "(meth)acrylate" herein refers to acrylate or methacrylate.

Examples of the cationic polymerizable monomer include alicyclic epoxides such as 3,4-epoxycyclohexenylmethyl-3', 4'-epoxycyclohexene carboxylate, glycidyl ethers such as bisphenol A diglycidyl ether, vinyl ethers such as 4-hydroxybutyl vinyl ether, and oxetanes such as 3-ethyl-3-hydroxymethy oxetane.

The prepolymer (or oligomer) may be a radical polymerizable prepolymer or a cationic polymerizable prepolymer. Examples of the radical polymerizable prepolymer include (meth)acrylate prepolymers such as a urethane (meth)acrylate prepolymer, an epoxy(meth)acrylate prepolymer, a polyester (meth)acrylate prepolymer, a triazine (meth)acrylate prepolymer and a silicon (meth)acrylate prepolymer, polythiol prepolymers such as a trimethylolpropane trithioglycolate prepolymer and a pentaerythritol tetrathioglycolate prepolymer, and unsaturated polyester prepolymers.

Examples of the cationic polymerizable prepolymer include a novolac epoxy resin prepolymer, an aromatic vinyl ether resin prepolymer, etc.

These monomers and prepolymers may be used either singly, or as a mixture of two or more monomers, as a mixture of two or more prepolymers or as a mixture of one or more monomers and one or more prepolymers, depending on required performance, coating properties, etc.

When ultraviolet light or visible light is employed for ionizing radiation, a photopolymerization initiator is usually added to the coating composition. In the case of a radical polymerizable monomer or prepolymer, a benzophenone compound, a thioxanthone compound, a benzoin compound, an acetophenone compound, etc. can be used as the photopolymerization initiator. In the case of a cationic polymerizable monomer or prepolymer, a metallocene compound, an aromatic sulfonium compound, an aromatic iodonium compound, etc. can be used as the photopolymerization initiator. The photopolymerization initiator may be used in an amount of about 0.1 to 5 parts by weight based on 100 parts by weight of the composition comprising the above-described monomer and/or prepolymer.

(Refractive Index)

Secondly, from the viewpoint of increasing the luminance, it is preferred to use as the binder resin one whose refractive index Nm is lower than the refractive index Ns of the resin of the coating-facing portion of the body portion 1 (the portion including the other surface 1$q$). The use of such a binder resin can reduce a loss of light due to its diffusion or reflection which can occur at the coating surface of the uneven coating 3 provided on the light entrance side of the optical sheet 10, thereby increasing the luminance. Further, compared to the case where the surface 1$q$ of the body portion 1, having the refractive index Ns, is exposed, the difference in refractive index at the interface with air is smaller in the case where the surface of the uneven coating 3, having the smaller refractive index Nm, is exposed. Therefore, the luminance can be increased by the presence of the uneven coating 3 which has a smaller difference in refractive index from air.

The refractive index Nm and the refractive index Ns are set to satisfy the relation: refractive index Nm<refractive index Ns. As known in an optical design theory on an antireflective film, in order to minimize the loss of incident light by reflection and maximize the luminance increasing effect, the refractive indices are also set to satisfy the relation: Nm=(Ns)$^{1/2}$(( )$^{1/2}$ represents the square root of ( )). Though it is generally difficult to strictly satisfy the relation with actually available materials, it is desirable to make the refractive indices approximate the relation as much as possible.

Assuming that the body portion 1 is composed of polyethylene terephthalate and the refractive index Ns of the body portion 1 is 1.65, a resign having a refractive index Nm of less than 1.65 (Nm<1.65) may be used for the uneven coating 3 to satisfy the above relation: refractive index Nm<refractive index Ns. It is best to use a resin whose refractive index Nm satisfies the above equation:

$$Nm=(1.65)^{1/2}=1.29.$$

A combination of two or more binder resins may be used to adjust various physical properties. In particular, in order to lower or adjust refractive index, a known low-refractive index resin may be used either singly or in combination with some other resin(s). A fluorine-containing polymer, for example, can be used as the low-refractive index resin. Though a fluorine-containing polymer may be used singly, it may be used in combination with a polymer not containing a fluorine atom in order to adjust physical properties, such as adhesion properties. The fluorine-containing polymer may be a polymer (copolymer) prepared by using a monomer not containing a fluorine atom concomitantly with a fluorine-containing monomer. The concomitant use of a monomer not containing a fluorine atom can adjust the physical properties of the fluorine-containing polymer, such as refractive index, adhesion properties, etc.

A fluorine-containing ionizing radiation curable resin, e.g. a fluorine-containing ionizing radiation curable acrylic resin, can be preferably used as the fluorine-containing polymer because of strong coating strength and rapid curing. The use of a fluorine-containing polymer can make the refractive index Nm not more than 1.45. An ionizing radiation curable resin not containing a fluorine atom, e.g. a polyfunctional acrylate monomer, may be used concomitantly with a fluorine-containing ionizing radiation curable resin.

A commercially available product may be used as the fluorine-containing polymer. Examples of such commercially available products include Opstar TU2181-6, Opstar TU2181-7, Opstar TU2202 and Opstar JN35, manufactured by JSR Corporation, and Optool AR110 and Optool AR100, manufactured by Daikin Industries, Ltd.

Besides the binder resin, the uneven coating 3 may contain a low-refractive index material to lower the refractive index of the coating. Known low-refractive index materials can be used, such as fine inorganic solid particles having a low refractive index, fine hollow particles each having a cavity or voids, etc. The "fine hollow particles" herein refers to fine particles each having a hollow structure, i.e. having a hollow or cavity within it, or a porous structure, i.e. having a number of pores.

The fine inorganic solid particles may be exemplified by silica particles (refractive index 1.45), magnesium fluoride particles (refractive index 1.38), $Na_3AlF_6$ particles (refractive index 1.33), etc. The average particle size of the inorganic solid particles is, for example, 10 nm to 100 nm. The fine hollow particles are typified by hollow silica particles. The average particle size of the fine hollow particles is, for example, 10 nm to 100 nm.

In view of the refractive index lowering effect, the low-refractive index material is generally used in an amount of 50 to 200 wt % based on the weight of the binder resin.

When the uneven coating 3 comprises, in addition to the binder resin, fine particles as an essential component to form surface unevenness, fine transparent particles may be used so as not to impair the light permeability of the optical sheet, the basic performance of the optical sheet. The fine particles preferably have a spherical particle shape. The term "spherical particles" herein refers to spherical or generally-spherical particles. The use of spherical particles can produce micro-protrusions, formed on the surface of the uneven coating 3, in such a shape that each micro-protrusion has a round top, not an angular top. Furthermore, in the case where fine spherical particles are not exposed but covered with the binder resin in the micro-protrusion portions, the fine particles are unlikely to escape and, in addition, the round resin portions at the tops of the micro-protrusions make contact with an adjacent member. Because the micro-protrusions can thus be formed in a slippery shape, it becomes possible to make an optical member, which is in contact with the optical sheet, or the optical sheet itself (in particular the micro-protrusions, especially their tops) hard to be scratched e.g. by friction. This can effectively prevent damage, such as chipping, to the contact portions.

Examples of such fine spherical particles may include resin beads such as acrylic resin beads, polycarbonate resin beads, polyurethane resin beads, etc., and inorganic beads such as glass beads, silica beads, etc.

The fine particles generally are not used also as the low-refractive index material, and preferably have a refractive index as close to the refractive index of the binder resin as possible in order not to diffuse light at the interfaces between the fine particles and the binder resin. This, however, does not hold true when it is intended to impart a light diffusing function to the optical sheet.

It is possible to use the fine particles for the formation of surface unevenness also as the above-described low-refractive index material. In this case, however, the fine particles need to be used in an amount as large as 50 to 200 wt % based on the weight of the binder resin in order to produce the intended refractive index lowering effect. On the other hand, the content of the fine particles in the binder resin is preferably up to 5 wt % in order to form the intended surface unevenness. Thus, the use of the fine particles also as a low-refractive index material in a large amount makes it difficult to form surface unevenness as intended and, in addition, makes the light diffusing properties of the coating higher than necessary. It is therefore preferred to concomitantly use fine particles for the formation of surface unevenness and fine particles as a low-refractive index material in such a manner that the two particulate components will adequately perform their respective functions. Thus, the fine particles for the formation of surface unevenness should preferably have a particle size of about 1 to 10 μm which is sufficient to form micro-protrusions for prevention of optical adhesion, and which provide a surface roughness not less than the longest wavelength of visible light ($Rz \geq 0.78$ μm). In addition, the fine particles should preferably have a refractive index as close to the refractive index of the binder resin as possible. On the other hand, the fine inorganic particles or fine hollow particles as a low-refractive index material should preferably have a particle size of about 0.01 to 0.2 μm, which is less than the shortest wavelength of visible light, and satisfy the relation: $Nm=(Ns)^{1/2}$.

The particle size of spherical particles is, for example, about 1 to 10 μm as a non-averaged primary particle size of an individual particle. A wide particle size distribution of spherical particles leads to a wide distribution of the heights of micro-protrusions (from the surface area of the uneven coating 3 where no micro-protrusion is present). Thus, spherical particles having a relatively large particle size may produce micro-protrusions having a relatively large height. The production of such high micro-protrusions contributes to the formation of voids. On the other hand, such high micro-protrusions make contact with an optical member at high frequency and are subjected to a large external force, and therefore the coating surface Pm is liable to be scratched. It is therefore preferred to use spherical particles having a narrow particle size distribution, most preferably those having a monodispersed or nearly monodispersed particle size distribution. For example, it is preferred to use monodispersed spherical particles whose half-value width in the particle size distribution is not more than 1 μm, as disclosed in the above-cited JP 3913870B. The use of such fine monodispersed spherical particles can enhance the uniformity of the heights of micro-protrusions formed by fine particles and lower the degree of concentration of load on relatively high micro-protrusions. The term "half-value width" in a particle size distribution refers to the width of the particle size distribution curve between the positions each having a height position corresponding to ½ of the peak height of the particle size distribution curve. The scratch resistance of the uneven coating 3 can thus be increased by the use of such spherical particles.

A volume-based (or weight-based) particle size distribution or average particle size, not a number-based one, is commonly used and is employed herein. Thus, a "particle size distribution" herein refers to a volume-average particle size, and a "half-value width" is also on a volumetric basis. A volume-based particle size distribution or average particle size can be measured e.g. by a dynamic light scattering method using a laser beam. It is also possible to measure the particle sizes of spherical particles by microscopic observation, and calculate a volume-based particle size distribution or average particle size from the measurement data.

When the maximum diameter of the spherical particles used exceeds 10 μm, the effect of changing the travel direction of light increases. Accordingly, when the optical sheet 10 is used as a luminance-increasing sheet, the optical function may be impaired, in particular, the light condensing effect of the optical element surface Pe of the optical sheet 10 may be lowered. The use of particles with a diameter of larger than 10 μm should preferably be avoided.

The present invention, however, does not exclude the use of spherical particles having a large diameter in order to impart to the coating a function to disperse light to a certain degree. When the minimum diameter of the spherical particles used is less than 1 μm, on the other hand, a high-level technology is required to disperse the spherical particles in the coating composition for forming the uneven coating 3. Furthermore, it is difficult to secure the height of unevenness on the uneven surface at the desired level of not less than 0.78 μm (in terms of 10-point average roughness Rz). In addition, such fine particles are generally costly.

The content of fine particles such as spherical particles is, for example, 2 to 15% by weight based on the weight of the binder resin. The area density of micro-protrusions can be adjusted by adjusting the content of fine particles.

It is possible to positively impart a light diffusing function to the uneven coating 3. For example, a light diffusion function can be imparted to the uneven coating 3 by making the fine particles in the coating act as a light diffusing agent. In order to make the fine particles act as a light diffusing agent, it is preferred to use such materials for the fine particles and the binder resin that produce a large difference in refractive index between the fine particles and the binder resin. The difference in refractive index can be made to be at least 0.1, preferably at least 0.15.

(Additive)

The uneven coating 3 may contain various known additives, such as a lubricant, a dispersant, a stabilizer, a plasticizer, an ultraviolet absorber, an antistatic agent, etc. Such additives are added to the above-described coating composition for forming the uneven coating 3.

A lubricant, for example, can increase the slippage on the uneven surface (outermost surface) of the uneven coating 3, and therefore the optical sheet itself becomes less likely to be scratched. Thus, the scratch resistance of the optical sheet can be increased.

Examples of usable lubricants include hydrocarbon lubricants such as liquid paraffin, paraffin wax and synthetic polyethylene wax; fatty acid lubricants such as lauric acid; higher alcohol lubricants such as stearyl alcohol; aliphatic amide lubricants such as stearic acid amide, oleic acid amide and erucamide; alkylene fatty acid amide lubricants such as methylenebisstearic acid amide and ethylenebisstearic acid amide; metal soap lubricants composed of a metal salt of stearic acid, such as zinc stearate, calcium stearate or magnesium stearate;

fatty acid ester lubricants such as stearic acid monoglyceride, stearyl stearate and hardened oil; and silicone lubricants such as silicone oil and modified silicone oil.

The modified silicone oil may include polyether-modified silicone oil, amino-modified silicone oil, epoxy-modified silicone oil, olefin-modified silicone oil, fluorine-modified silicone oil, alcohol-modified silicone oil, higher fatty acid-modified silicone oil, etc.

Modified silicone oil, especially polyether-modified silicone oil, is preferred among the above-described various lubricants. Polyether-modified silicone oil is a compound having a siloxane backbone modified with a polyether backbone, in particular a block copolymer in which a polyether backbone is bonded to one or both ends and/or a side chain of a siloxane backbone. Polyether-modified dimethyl polysiloxane is an example of polyether-modified silicone oil. Polyether-modified dimethyl polysiloxane is a compound having a dimethyl polysiloxane backbone to which a polyether backbone is bonded.

[Smooth Coating (Scratch-Resistant Coating)]

Instead of the above-described uneven coating 3, the optical sheet according to the first embodiment of the present invention may be provided with a smooth coating 4 having a smooth surface on the body portion 1, as illustrate in the cross-sectional view of FIG. 3. The back surface Pm, opposite from the optical element surface Pe, is the smooth surface of the smooth coating 4.

The smooth coating 4 is a transparent layer which contains at least a resin and has a smooth surface, and can be formed by applying a coating composition onto the body portion 1. The smooth coating 4 is a layer to prevent scratching on the optical sheet upon contact between the front and back surfaces of optical sheets 10 without a protective film or upon contact with another optical member whose contact surface is roughened in order to prevent optical adhesion.

The smooth coating 4 can be formed from the same coating composition as described above with reference to the formation of the uneven coating 3, but not containing the fine particles for the formation of surface unevenness. Thus, the same resin component may be used, and the same additives, such as the low-refractive index resin, the low-refractive index material, the lubricant, etc. may be used. Furthermore, the above-described relationships between the refractive indices Nm and Ns hold true for the optical sheet of this embodiment. Therefore, a further description thereof will be omitted.

[Hardnesses of the Front and Back Surfaces]

The hardness He of the front surface of the optical sheet 10, i.e. the optical element surface Pe which is the outermost surface on the side of the unit optical elements 2, and the hardness Hm of the back surface of the optical sheet 10, i.e. the coating surface (back surface) Pm which is the outermost uneven surface on the side of the uneven coating 3 or the outermost smooth surface on the side of the smooth coating 4, herein refer to pencil hardness.

In particular, the "pencil hardness" relating to the hardness He and the hardness Hm herein refers to one as measured under the conditions of a load of 1000 g and a speed of 1 mm/s in accordance with HS K5600-5-4 (1999). It is preferred that the hardness Hm of the coating surface (back surface) Pm of the uneven coating 3 or the smooth coating 4 be not less than F in terms of pencil hardness, and the hardness Hm be not less than the hardness (pencil hardness) He of the opposite optical element surface Pe (Hm≥He). Thus, it is preferred that the hardness He and the hardness Hm, measured for the optical sheet 10, lie within the region Ea shown in FIG. 2.

The hardness Hm is made to be not less than the hardness He because the coating surface Pm is likely to be scratched unless the hardness Hm of the coating surface (back surface) Pm is made to be not less than the hardness He of the opposite optical element surface Pe. On the other hand, scratching on the optical element surface Pe can be prevented by making the optical element surface Pe flexible so that it deforms when an external force is applied to it, and returns when released from the external force. In contrast, in order to prevent optical adhesion, the coating surface Pm, especially the uneven surface of the uneven coating 3, is required to maintain the shape without deformation even when an external force is applied to the surface. In addition, stress concentrates on point-like protrusions on the uneven coating 3, and the coating surface Pm must withstand the stress. For the above reasons, the hardness Hm is preferably made to be not less than the hardness He.

In the case of the smooth coating surface Pm of the smooth coating 4, unlike the uneven surface Pm of the uneven coating 3, there is no need to consider the maintenance of surface unevenness against an external force. However, when the smooth coating surface Pm comes into contact with an uneven surface, for example an optical member such as a light diffusing sheet or the optical element surface Pe of another optical sheet 10, a dent may be produced in the smooth surface. The dent, if it is not repaired and remains in the surface, leads to an optical defect. In addition, such an optical defect may be noticeable because of the smoothness of the surface. The smooth coating surface Pm is therefore required to resist deformation by an external force.

A scratch on the optical element surface Pe is less noticeable and problematic because of the surface unevenness. In contrast, even a slight scratch can be noticeable in the smooth coating surface Pm of the smooth coating 4.

Therefore, also in the case where the smooth coating 4 is employed, the hardness Hm is preferably not less than the hardness He.

By thus setting the hardnesses He and Hm, scratching or scraping on the optical element surface Pe and the coating surface Pm can be effectively prevented even when the front surface (optical element surface Pe) or the back surface (coating surface Pm) of the optical sheet makes contact with the back surface (coating surface Pm) or the front surface (optical element surface Pe) of another optical sheet, or when the optical sheet makes contact with an uneven surface of another optical member.

More preferably, the hardness He and the hardness Hm satisfy the following relation:

hardness $He+3 \geq$ hardness $Hm \geq$ hardness $He+2$ wherein the expression "He+1" indicates a hardness harder than He by one unit on the pencil hardness scale.

Thus, it is preferred that the hardness Hm of the coating surface (back surface) Pm be made to be higher than the hardness He of the optical element surface Pe by at least +2 units and at most +3 units on the pencil hardness scale. At first glance, it appears that the higher the pencil hardness of a surface is, the less the surface is likely to be scratched. It has been found, however, that if the optical element surface Pe is too hard, the surface Pe is rather more likely to be scratched when two optical sheets 10, facing in the same direction, are stacked together, and that scratching can be minimized by making the hardness He and the hardness Hm satisfy the above relation.

To specify the hardness Hm of the coating surface and the hardness He of the optical element surface as described above, in particular, to provide the upper limit "He+3" for the hardness Hm of the coating surface, is effective also for preventing scratching of the coating 3 or 4 on another optical member disposed adjacent to the optical sheet 10.

The pencil hardness scale has the following grading: ..., 3B, 2B, B, HB, F, H, 2H, 3H, 4H, 5H, ...., lining up in order of increasing hardness. On the pencil hardness scale, "HB+1" indicates the hardness "F" which is one unit harder than "HB", and "HB+2" indicates the hardness "H" which is two units harder than "HB". Thus, when the hardness He is HB, the relational expression "hardness He+3≥hardness Hm≥hardness He+2" indicates "2H≥hardness Hm≥H".

Unlike the optical element surface Pe, the coating surface (back surface) Pm is designed to resist, through the hardness of the coating 3 or 4, scratching by an external force, i.e. an eternal deformation or destruction. Such a design is employed especially when the coating is composed of a hard cured product of an ionizing radiation curable resin. Therefore, when the back surface is the surface of a coating, the minimum of the hardness Hm of the back surface is preferably F, which is relatively hard as compared to the case where the back surface is the other surface $1q$ of the body portion.

By thus setting the hardnesses He and Hm, scratching or scraping on the optical element surface Pe and the coating surface Pm can be more securely prevented even when the front surface or the back surface of the optical sheet makes contact with the back surface or the front surface of another optical sheet, or when the optical sheet makes contact with another optical member (especially with an uneven surface of an optical member in the case of the smooth coating 4) (see Tables 1, 3 and 4 below).

(Recovery Rate in Martens Hardness Test and Martens Hardness)

For the hardness He of the optical element surface Pe and the hardness Hm of the uneven coating surface Pm of the uneven coating 3, it is preferred to specify the recovery rate in a Martens hardness test. The Martens hardness is an index of hardness, and can be measured by using a micro hardness tester PICODENTOR® HM500 (ISO 14577-1), available from Fischer Instruments K.K.

The recovery rate in a Martens hardness test and the Martens hardness are characteristic values measured by using the HM500 hardness tester. In particular, the Martens hardness is calculated from a press-in depth (μm), measured with a certain press-in load in a hardness test using the hardness tester. The press-in load is a load in the normal direction of the optical sheet 10. The press-in depth is the depth of a point in a surface being tested when the load is applied to the point, with the depth of the point before the application of the load being taken as 0. The recovery rate (%) is calculated using the following formula (1):

Recovery rate(%)=[(press-in depth under load)−(press-in depth after removal of load)]/[press-in depth under load]×100    ()

The scratch resistance of an optical sheet can be increased when one or both of the unit optical elements 2 and the uneven coating 3, besides their satisfying the above-described relation with respect to the pencil hardnesses, have the recovery rate not less than 50% (see Table 2 below). If the recovery rate is high, the degree of shape recovery after application of an external force will be high. Scratching, including the production of a defect, a dent, etc. due to eternal deformation, will therefore be less likely to occur.

The above-described requirements for the hardness He and the hardness Hm with respect to the pencil hardness and the recovery rate in the Martens hardness test can be met by using a resin, particularly an ionizing radiation curable resin or the like, for forming the unit optical elements 2 and the uneven coating 3, and by adjusting the resin composition. Further, warpage of an optical sheet e.g. due to shrinkage upon curing can be effectively preventing by using the same curable resin, such as an ionizing radiation curable resin, for both the unit optical elements 2 and the uneven coating 3.

With reference to the Martens hardness, as shown in Table 2 below, an optical sheet can have excellent scratch resistance when the uneven coating surface Pm has a hardness of 100 to 180 N/mm$^2$ (rounded to the nearest ten). However, the Martens hardness of 220 N/mm$^2$ does not result in good. The scratch resistance is inferior, though still good, when the Martens hardness of the uneven coating surface Pm is as high as 220 N/mm$^2$, even though the recovery rate is over 50% (Example A3 in Table 2).

As with the uneven coating surface Pm, the recovery rate the optical element surface Pe is preferably not less than 50% because a dent or depression, produced by an external force, is less likely to remain in the surface. The Martens hardness of the optical element surface Pe may be lower than that of the uneven coating surface Pm to obtain excellent scratch resistance (about 2 to 4 N/mm$^2$ in Table 2).

[Additional Layer]

Besides the above-described layers, the optical sheet 10 may contain an additional layer(s) without departing from the gist of the present invention. For example, the optical sheet 10 may also be provided with an antistatic layer. The antistatic layer can reduce attachment of foreign matter, such as dust, to the surface, thereby preventing scratching of foreign matter on the surface. Instead of providing an independent antistatic layer, it is possible to add an antistatic agent to at least one of the body portion 1, the unit optical elements 2 and the coating 3 or 4 (the uneven coating 3 or the smooth coating 4) to impart an antistatic function thereto.

[C-2] Optical Sheet According to the Second Embodiment

The optical sheet according to the second embodiment, shown in FIGS. 8 through 14, will now be described. The optical sheet 10 according to the second embodiment is the same as the optical sheet according to the first embodiment in that it comprises the body portion 1 and the unit optical elements 2 provided on one surface $1p$ of the body portion 1, but differs from the optical sheet according to the first embodiment only in that it is not provided with the coating 3 or 4. One of the pair of the main surfaces of the optical sheet 10 is configured as an optical element surface Pe formed by the unit optical elements 2, while the back surface (the other one of the pair of the main surfaces), opposite from the optical element surface Pe, of the optical sheet 10 consists of the other surface $1q$ (opposite from the one surface $1p$ on which the unit optical elements 2 are provided) of the body portion 1. The respective layers of the optical sheet of the second embodiment will now be described in greater detail, focusing on differences from the optical sheet according to the first embodiment.

[Body Portion]

The body portion may have the same construction as the above-described first embodiment. In the optical sheet according to the second embodiment, however, the other surface $1q$ of the body portion 1 is the back surface $1q$. The other surface $1q$ of the body portion 1 may either be a smooth surface or an uneven surface.

[Formation of the Body Portion and the Unit Optical Elements]

The optical sheet 10, consisting of the body potion 1 and the unit optical elements 2, can be formed integrally using the same material by a molding method such as melt extrusion, injection molding, hot press embossing, etc. Alternatively, the unit optical elements 2 can be formed as a distinct layer on the body portion 1 by a method comprising bringing a resin solution into contact with the body portion 1 in the form of a film or a molded product, and solidifying the resin solution between the body portion 1 and a mold by a chemical (curing) reaction or by cooling, thereby forming the unit optical elements 2 such as prisms on the surface of the body portion 1.

For example, the unit optical elements 2 can be produced by a so-called 2P method (photopolymer method) which uses an ionizing radiation curable resin as a resin solution, and cures the resin by ionizing radiation, such as ultraviolet radiation or electron beam radiation. When a transparent substrate, such as a resin sheet composed of a thermoplastic resin, is used for the body portion 1 in this method, a resin layer (land portion) having a small thickness and the unit optical elements 2 lying on the resin layer are formed integrally on the transparent substrate.

In this case, the resin layer (land portion) may either be viewed as part of the body portion 1 or viewed as a distinct layer different from the body portion 1. According to the former concept, the body portion 1 consists of the rein layer (land portion) and the transparent substrate. According to the latter concept, the body portion 1 consists of the transparent substrate, and the resin layer (land portion) is neither included in the body portion 1 nor in the optical elements 2. The latter concept places importance on the difference in the resin between the transparent substrate and the resin layer, e.g. in the case where a thermoplastic resin is used for the transparent substrate (resin sheet) as the body portion 1, while an ionizing radiation curable resin is used for the unit optical elements 2 and the resin layer (land portion) according to a preferred embodiment of the present invention.

By using a thermoplastic resin for the body portion 1 and an ionizing radiation curable resin for the unit optical elements 2, the pencil hardness Hm of the back surface Pm can be set by the physical properties of the thermoplastic resin, while the pencil hardness He of the optical element surface Pe can be set by the physical properties of the ionizing radiation curable resin. Thus, the pencil hardness Hm of the back surface Pm and the pencil hardness He of the optical element surface Pe can be set easily and independently of each other. Furthermore, by using a thermoplastic resin sheet for the body portion 1 which generally occupies the majority of the thickness of the optical sheet 10, flexibility can be imparted to the optical sheet 10 with ease, and shaping of the unit optical elements 2 can be performed by the 2P method with high accuracy.

(Back Surface: the Other Surface of the Body Portion)

The other surface $1q$ of the body portion 1 is the back surface Pm of the optical sheet 1, exposed on the opposite side from the optical element surface Pe. The back surface Pm may either be a smooth surface or an uneven surface. FIG. 8 illustrates the case where the back surface Pm of the optical sheet 10 is a flat surface.

When an optical member, disposed adjacent to the optical sheet 10, can take on the function of preventing optical adhesion between the optical sheet 10 and the optical member, the back surface Pm basically need not be an uneven surface. On the other hand, the optical sheet 10 may take on part or the whole of the function of preventing optical adhesion to an adjacent optical member. Thus, the back surface Pm of the optical sheet 10 may be made to be an uneven surface to prevent adhesion between the optical sheet 10 and another member which makes contact with the back surface Pm of the optical sheet 10. A smooth back surface Pm is free from the problem of the lowering of luminance e.g. due to scattering of light at an uneven surface. The use of a smooth back surface Pm can therefore achieve a higher luminance.

The back surface Pm is the other surface $1q$ of the body portion 1, and is the exposed surface of the body portion 1. Further, the back surface Pm is the surface of the transparent substrate constituting the body portion 1.

The back surface Pm is preferably formed simultaneously with the production of the body portion 1. This means that when a resin sheet, for example, is produced as the body portion 1, the back surface Pm, which is one of the opposite surfaces of the resin sheet, is formed simultaneously with the production of the resin sheet. On the other hand, when the body portion 1 is produced by first producing two independent resin sheets composed of different resins, followed by lamination of the resin sheets to produce a laminate as the body portion 1, the back surface Pm is formed upon the production of one of the two resin sheets, i.e. before the lamination of the two resin sheets. The use of such a laminate as the body portion 1, which necessitates the lamination step, is undesirable from the viewpoint of reduction in the production cost.

However, when a laminate of two resin layers as the body portion 1 is produced by two-layer co-extrusion, the back surface Pm is formed simultaneously with the production of the body portion 1.

In the case of an uneven surface Pm, the uneven surface of the body portion 1 can be obtained by known methods without depending on a coating.

For example, a two-layer laminated thermoplastic resin sheet as the body portion 1 may be produced by two-layer co-extrusion, with the surface of one layer being the one surface $1p$ of the body portion 1 and the surface of the other layer being the back surface Pm of the body portion 1. By adding fine particles to the other layer in advance, the fine particles can make the back surface Pm an uneven surface. A multi-layer resin sheet consisting of three or more resin layers may be produced as the body portion 1 by means of the co-extrusion, with one layer on the back surface side containing fine particles.

The fine particles to be contained in the body portion 1 may include fine particles of a crosslinked resin, such as an acrylic resin, a polycarbonate resin, a polystyrene resin, etc., and fine particles of an inorganic material, such as glass, silica, alumina, etc.

Alternatively, a rough back surface Pm can be formed by a method which involves producing a thermoplastic resin sheet as a transparent substrate, followed by hot press embossing of the surface of the resin sheet. Alternatively, a rough back surface Pm can be formed by using an embossing roll, which is a cooling roll having an uneven surface, when producing a thermoplastic resin sheet by melt extrusion. Alternatively, a rough back surface Pm can be formed by using a mold having a rough mold surface when injection-molding a thermoplastic resin into the body portion 1.

[Unit Optical Elements]

The unit optical elements of the optical sheet according to the second embodiment may be the same as the above-described unit optical elements of the optical sheet according to the first embodiment.

[Pencil Hardness]

It is preferred that the hardness Hm of the back surface Pm be not less than B and not less than the hardness He of the opposite optical element surface Pe (Hm≥He). Thus, it is preferred that the hardness He and the hardness Hm, measured for the optical sheet 10, lie within the region Ea shown in FIG. 9. As with the above-described optical sheet according to the first embodiment, the hardness Hm of the back surface Pm and the hardness He of the optical element surface Pe are pencil hardnesses measured under the conditions of a load of 1000 g and a speed of 1 mm/s in accordance with JIS K5600-5-4 (1999).

The hardness Hm is made to be not less than the hardness He because the back surface Pm is likely to be scratched unless the hardness Hm of the back surface Pm is made to be not less than the hardness He of the opposite optical element surface Pe. On the other hand, scratching on the optical element surface Pe can be prevented by making the optical element surface Pe flexible so that it deforms when an external force is applied to it, and returns when released from the external force.

When the back surface Pm is a smooth surface, there is no surface unevenness which will deform when an external force is applied thereto. However, a dent can be produced in the smooth surface. The dent, if it is not repaired and it remains in the surface, leads to an optical defect. Therefore, the back surface Pm is required to resist deformation by an external force. In addition, such an optical defect may be noticeable because of the flatness of the surface. The back surface Pm is therefore required to withstand deformation by an external force. In addition, while a scratch on the optical element surface Pe is less noticeable because of the surface unevenness, even a slight scratch can be noticeable in the back surface Pm when it is a smooth surface.

When the back surface Pm is an uneven surface, in order to prevent optical adhesion, the back surface Pm is required to maintain the irregular surface shape without deformation even when an external force is applied to the surface. In addition, stress concentrates on protrusions on the uneven surface, and the back surface Pm must withstand the stress. For the above reasons, the hardness Hm is preferably made to be not less than the hardness He.

By thus setting the hardnesses He and Hm, scratching or scraping on the optical element surface Pe and the back surface Pm can be effectively prevented even when the front surface (optical element surface Pe) or the back surface Pm of the optical sheet makes contact with the back surface Pm or the front surface (optical element surface Pe) of another optical sheet, or when the optical sheet makes contact with an uneven surface of another optical member.

More preferably, the hardness He and the hardness Hm satisfy the following relation:

hardness $He+3 \geq$ hardness $Hm \geq$ hardness $He+2$ wherein the expression "He+1" indicates a hardness harder than He by one unit on the pencil hardness scale.

Thus, it is preferred that the hardness Hm of the back surface Pm be made to be higher than the hardness He of the optical element surface Pe by at least +2 units and at most +3 units on the pencil hardness scale. At first glance, it appears that the higher the pencil hardness of a surface is, the less the surface is likely to be scratched. It has been found, however, that if the optical element surface Pe is too hard, the surface Pe is rather more likely to be scratched when two optical sheets 10, facing in the same direction, are stacked together, and that scratching can be minimized by making the hardness He and the hardness Hm satisfy the above relation. The pencil hardness scale has previously been described with reference to the first embodiment.

By thus setting the hardnesses He and Hm, scratching or scraping on the optical element surface Pe and the back surface Pm can be more securely prevented even when the front surface or the back surface of the optical sheet makes contact with the back surface or the front surface of another optical sheet, or when the optical sheet makes contact with another optical member (see Table 5 below).

To specify the hardness Hm of the back surface and the hardness He of the optical element surface as described above, in particular, to provide the upper limit "He+3" for the hardness Hm of the other surface 1q of the body portion 1 (the back surface Pm), is effective also for preventing scratching of the other surface 1q on another optical member disposed adjacent to the optical sheet 10.

Unlike the optical element surface Pe, the back surface Pm, consisting of the other surface 1q of the body portion 1, is designed to resist scratching (an eternal deformation or destruction) by an external force through the hardness of the body portion 1 and also through the elastic deformation of the body portion 1 and recovery from the deformation. Such a design is employed especially when the body portion 1 is composed of a thermoplastic resin such as an acrylic resin or a polycarbonate resin. Therefore, when the back surface is the other surface 1q of the body portion 1, the minimum of the hardness Hm of the back surface is preferably B, which is relatively soft as compared to the case where the back surface is the surface of a coating composed of a cured product of an ionizing radiation curable resin.

As shown in below-described FIG. 14, in a recommended manner of use of the optical sheet 10 according to the present invention, prevention of optical adhesion may be effected not by the optical sheet itself but by another optical member in contact with the optical member. In this case, the back surface Pm may basically be not a rough source but a smooth surface.

[Optical Member]

An optical member according to the present invention comprises a plurality of optical sheets (optical members) stacked together, as shown conceptually in the cross-sectional diagrams of FIGS. 4, 5, 11 and 12. The phrase "optical sheets 10a, 10b are stacked together" means that the optical sheets 10a, 10b are disposed adjacent to and in contact with each other, and does not mean that the sheets are disposed with a space between them. In the embodiments illustrated in FIGS. 4, 5, 11 and 12, the optical sheets 10a, 10b are stacked together such that the optical element surface Pe of the lower optical sheet 10b and the back surface Pm of the upper optical sheet 10a are in contact with each other.

Figure 4:
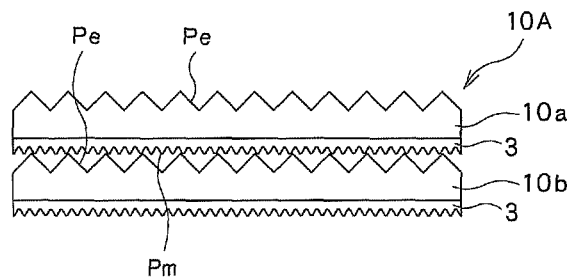
FIG. 4 is a cross-sectional view showing an optical member including the optical sheet of FIG. 1.
Figure 5:
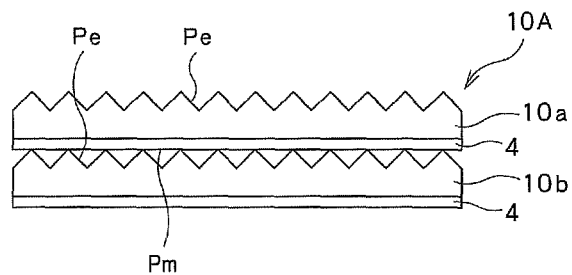
FIG. 5 is a cross-sectional view showing an optical member including the optical sheet of FIG. 3.

The optical members 10A shown in FIGS. 4 and 5 are each produced by the use of an optical sheet 10 according to the first embodiment of the present invention. In the embodiment shown in FIG. 4, the optical sheets 10a, 10b each have an uneven coating 3, and the back surface (coating surface) Pm of each of the optical sheets 10a, 10b consists of the uneven surface of the uneven coating 3. In the embodiment shown in FIG. 5, on the other hand, the optical sheets 10a, 10b each have a smooth coating 4, and the back surface (coating surface) Pm of each of the optical sheets 10a, 10b consists of the smooth surface of the smooth coating 4. Though not shown diagrammatically, one of two optical sheets may have an uneven coating 3, and the other one may have a smooth coating 4.

Figure 11:
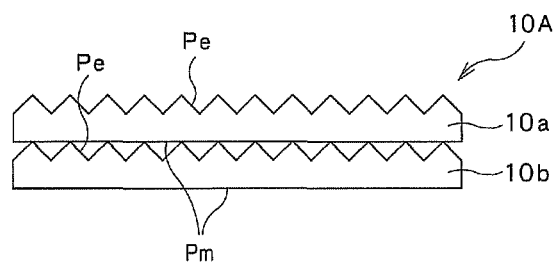
FIG. 11 is a cross-sectional view showing an optical member including the optical sheet of FIG. 8.
Figure 12:
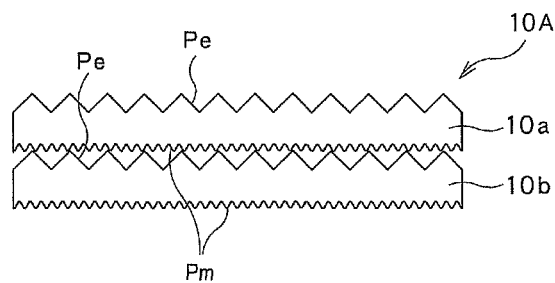
FIG. 12 is a cross-sectional view showing an optical member including the optical sheet of FIG. 10.

On the other hand, the optical members 10A shown in FIGS. 11 and 12 are each produced by the use of an optical sheet 10 according to the second embodiment of the present invention. In the embodiment shown in FIG. 11, the optical sheets 10a, 10b each have a smooth back surface Pm. In the embodiment shown in FIG. 12, on the other hand, the optical sheets 10a, 10b each have an uneven (rough) back surface Pm. Though not shown diagrammatically, one of two optical sheets may have an uneven (rough) back surface Pm, and the other one may have a smooth back surface Pm.

An optical member 10A according to the present invention may comprise three or more optical sheets.

In the optical members 10A illustrated in FIGS. 4, 5, 11 and 12, the upper and lower optical sheets 10a, 10b are stacked together such that the optical element surfaces Pe face in the same direction. The present invention, however, does not exclude the manner of stacking the optical sheets together such that the optical element surfaces Pe face in opposite directions. The unit optical elements 2 of each of the upper and lower optical sheets 10a, 10b are unit rod-like prisms having a triangular cross-sectional shape and, for convenience of the drawing, both the unit optical elements 2 are depicted such that their ridge lines extend in a direction perpendicular to the surface of the paper. In fact, however, such unit rod-like optical elements are generally arranged such that the ridge-line direction of the unit optical elements of an optical sheet 10a intersects, e.g. at right angles, the ridge-line direction of the unit optical elements of an optical sheet 10b.

In an optical member comprising two optical sheets stacked together, the unit optical elements 2 and, if included, the uneven coating 3 or the smooth coating 4, which provides the coating surface Pm, may be either the same or different between the optical sheets.

When such an optical member 10A, composed of optical sheets 10a, 10b, is incorporated into a surface light source device, the optical member 10A has scratch resistance: scratching or scraping on the back surface Pm of the optical sheet 10a and the optical element surface Pe of the optical sheet 10b, caused by contact between the two optical sheets, hardly occurs. If the refractive index Nm of the coting 3 or 4, which provides the back surface Pm, and the refractive index Ns of the coating-facing portion of the body portion 1 are adjusted in each sheet in the manner described above, the sheets 10a, 10b (optical member 10A) can increase the luminance.

<[D]> Surface Light Source Device>

A surface light source device according to the present invention is a light source device which includes at least a light source and an optical sheet 10 for transmitting light from the light source, and which emits light over an area. For the constructions and the arrangements of components other than the optical sheet 10, including the light source and optical members which may be provided as necessary, those constructions and arrangements of members or components which are used in conventional known surface light source devices may arbitrarily be employed.

Figure 6:
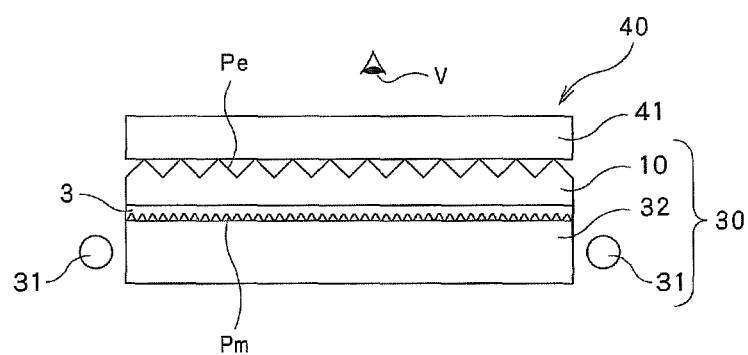
FIG. 6 is a cross-sectional view showing a surface light source and a liquid crystal display device, including the optical sheet of FIG. 1.
Figure 7:
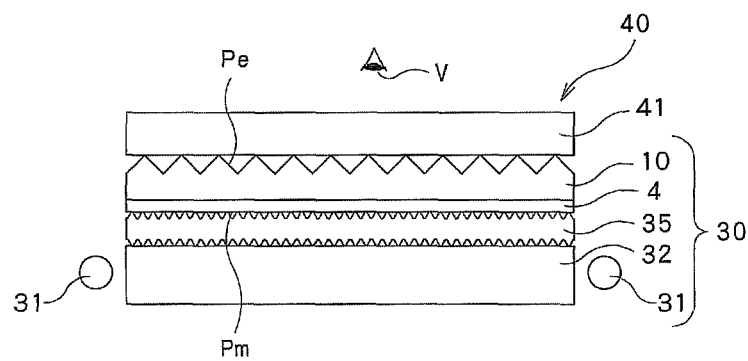
FIG. 7 is a cross-sectional view showing a surface light source and a liquid crystal display device, including the optical sheet of FIG. 3.

For example, the surface light source device 30 illustrated in FIG. 6 includes a light source 31, a light guide plate 32 beside which the light source 31 is provided, and an optical sheet 10 according to the first embodiment, disposed on the light exit surface of the light guide plate 32. The light source 31, the light guide plate 32 and other optical members (not shown) may be any known ones. In the surface light source device 30 illustrated in FIG. 6, the optical sheet 10 is disposed in such a direction that the optical element surface Pe lies on the light exit side, the upper side in FIG. 6.

On the other hand, the back surface Pm, consisting of a coating surface, of the optical sheet 10 lies on the light guide plate 32 side, and the coating surface Pm is in contact with the light exit surface of the light guide plate 32, another optical member in contact with the optical sheet 10. In the illustrated embodiment, the coating surface Pm of the optical sheet 10 is the uneven surface of an uneven coating 3. The uneven coating 3 prevents optical adhesion between the optical sheet 10 and the light guide plate 32, thereby effectively preventing non-uniform in-surface distribution (in-plane distribution) of luminance, the formation of an interference pattern, etc. due to optical adhesion. Furthermore, because of the high scratch resistance of the coating surface Pm, scratching on the optical sheet 10 due to contact of the coating surface pm with the light exit surface of the light guide plate 32, can be effectively prevented.

While in the embodiment illustrated in FIG. 6 the optical sheet 10, incorporated into the surface light source device 30, has the uneven coating 3, an optical sheet 10 incorporated into the surface light source device 30 may have a smooth coating 4 instead of the uneven coating 3. In the surface light source device illustrated in FIG. 7, the surface of another optical member, in contact with the smooth coating 4, is made to be an uneven surface to prevent optical adhesion. Though the optical member in contact with the smooth surface 4 may be the light guide plate 32, in the illustrate embodiment another optical member, e.g. a light diffusing sheet 35, whose optical sheet-facing surface is an uneven surface is disposed between the light guide plate 32 and the optical sheet 10. Also in the surface light source device 30 shown in FIG. 7, scratching on the smooth coating surface Pm of the optical sheet 10 and problems due to optical adhesion can be effectively avoided even when the coating surface Pm makes contact with the uneven surface of the member disposed adjacent to the optical sheet 10 (e.g. the rough light exit surface of the light diffusing sheet 35).

Figure 13:
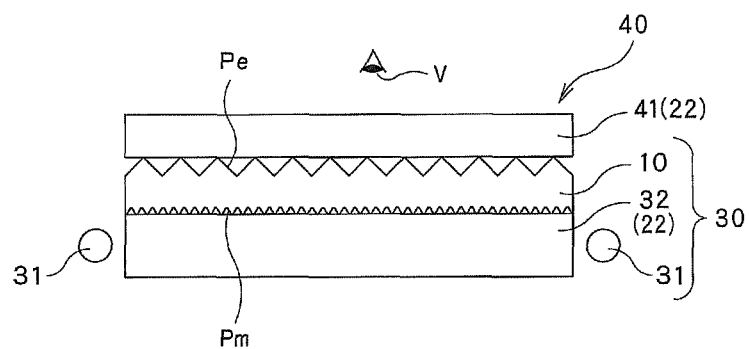
FIG. 13 is a cross-sectional view showing a surface light source and a liquid crystal display device, including the optical sheet of FIG. 10.
Figure 14:
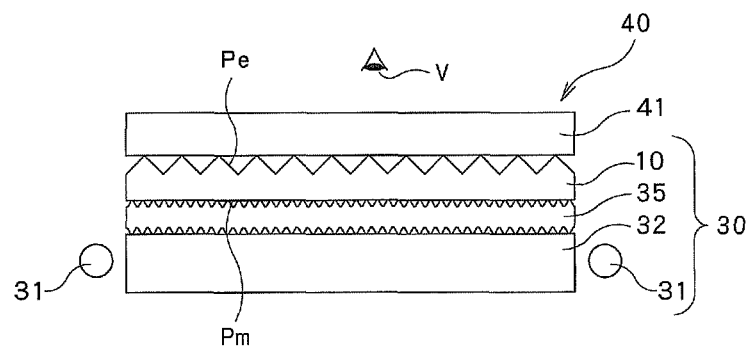
FIG. 14 is a cross-sectional view showing a surface light source and a liquid crystal display device, including the optical sheet of FIG. 8.

As shown in FIGS. 13 and 14, an optical sheet according to the second embodiment of the present invention may be used to produce a surface light source device. In the embodiment shown in FIG. 13, the back surface Pm of the optical sheet 10 incorporated into the surface light source device 30 is made to be an uneven surface to prevent optical adhesion between the optical sheet 10 and an adjacent light guide plate 32. In the embodiment shown in FIG. 14, on the other hand, the back surface Pm of the optical sheet 10 incorporated into the surface light source device 30 is a smooth surface, whereas a member 35, e.g. a light diffusing sheet, adjacent to the optical sheet 10 has an uneven surface. Optical adhesion between the optical sheet 10 and the adjacent member 35 can be prevented by the uneven surface of the member 35.

Though only one optical sheet 10 is incorporated into a surface light source device in the embodiments of FIGS. 6, 7, 13 and 14, it is possible to incorporate an optical member 10A composed of a plurality of, for example two, optical sheets into a surface light source device, as shown in FIGS. 4, 5, 11 and 12.

Though the surface light source devices shown in FIGS. 6, 7, 13 and 14 are of the edge-light type, an optical sheet(s) according to the present invention may be incorporated into a surface light source device of the direct-light type. Linear cold-cathode tubes, point-like LEDs (light emitting diodes), a planar EL (electroluminescent) emitter, etc. can be used for a light source 31. A transparent acrylic resin, for example, is used for a light guide plate 32, and a light diffusing portion may be provided, e.g. by printing, on the surface opposite from the light exit surface.

A surface light source device according to the present invention generally includes a reflective member, such as a reflective plate, in order to direct light from a light source 31 toward a light guide plate 32 and an optical sheet 10. The reflective member is composed of a high-reflectance material such as a metal. The surface light source device may further include other optical members, such as a light diffusing plate, a polarization separation film, a wave plate, etc. as necessary.

<[D]> Liquid Crystal Display Device>

A liquid crystal display device according to the present invention is a display device including at least a surface light source device according to the present invention, which is used as a backlight, and a transmission type liquid crystal panel disposed on the light exit surface of the surface light source device. An optical sheet(s) 10 according to the present invention is provided in the surface light source device. Members or components which are used in conventional known liquid crystal display devices may arbitrarily be employed for the liquid crystal panel and not-shown other members such as an optical member, e.g. an anti-glare film, a panel drive circuit, etc. in the display device.

For example, in the liquid crystal display devices 40 shown in FIGS. 6, 7, 13 and 14, a transmission type liquid crystal panel 41 is disposed on the light exit surface of the above-described surface light source device 30 as a backlight. As shown in the Figures, the light exit surface of the surface light source device 30 is the optical element surface Pe of the optical sheet 10. Thus, the optical element surface Pe is in contact with the back surface of the liquid crystal panel 41. The back surface of the liquid display panel 41 generally corresponds to the surface of a polarizing plate constituting the panel 41. An image on the liquid crystal panel 41 is viewed by a viewer V (depicted above the respective device) via light from the surface light source device 30.

Even though the optical sheet 10 and the liquid crystal panel are disposed adjacent to each other in the illustrated liquid crystal display devices, scratching on the optical sheet 10 can be prevented because of the increased scratch resistance of the optical element surface Pe. Furthermore, the use of the optical sheet 10 in the surface light source device 30 can increase the luminance.

Though the surface light source devices 30, provided in the liquid crystal display devices 40 illustrated in FIGS. 6, 7, 13 and 14, are of the edge-light type, it is also possible to use a surface light source device of the direct-light type, as described previously.

<[F] Advantageous Effects>

(1) According to the above-described optical sheet of the present invention, the pencil hardness He of the optical element surface Pe of an optical sheet 10 and the pencil hardness Hm of the back surface Pm, opposite from the optical element surface Pe, of the optical sheet 10 are adjusted as described above. This can increase the scratch resistance of the optical sheet. Especially when two optical sheets are stacked together, scratching on the optical sheets can be prevented very effectively.

In particular, even when optical sheets in a rolled state are subjected to vibration e.g. during their storage or transportation, scratching on the front and back surfaces of the optical sheets can be prevented. This can prevent lowering of the quality of the optical sheets, such as poor appearance. It therefore becomes possible to eliminate the use of a protective film which is commonly attached to the front and back surfaces of an optical sheet until its use, leading to resource saving and cost reduction.

When the refractive index of a coating and the refractive index of a body portion in an optical sheet satisfy the above-described relation, the provision of the coating to increase the scratch resistance does not incur a decrease in the luminance. Thus, there is no decrease in the luminance despite the increase in the number of layers due to the provision of the coating. It therefore becomes possible to increase the luminance while ensuring the high scratch resistance of the optical sheet.

(2) The above-described surface light source device and liquid crystal display device include an optical sheet(s) according to the present invention, having increased scratch resistance of the front and back surfaces. Therefore, even when the devices are subjected to vibration e.g. during their storage or transportation, scratching on the front and back surfaces of the optical sheet(s) can be effectively prevented.

EXPERIMENTAL EXAMPLES

The following examples further illustrate the present invention.

<Research 1>

Research 1 was carried out on optical sheets having the construction of FIG. 1. Thus, the optical sheets tested in research 1 each had an uneven back surface Pm consisting of the uneven surface of an uneven coating.

[Preparation of Coating Compositions for the Formation of Uneven Coatings]

The following coating compositions were prepared to form uneven coatings with varying pencil hardnesses:

(Composition A1: Coating with Pencil Hardness HB)

| | |
|---|---|
| Fluorine-containing urethane acrylate UV-curable resin | 99 parts by weight |
| Fine particles (monodispersed spherical crosslinked acrylic resin beads having an average particle size of 5 μm) (MX-500H, Soken Chemical & Engineering Co., Ltd.) | 1 parts by weight |
| Photoinitiator (1-hydroxycyclohexyl phenyl ketone) (Irgacure ® 184) | 1 parts by weight |
| Solvent (methyl isobutyl ketone:cyclohexanone = 1:1 weight ratio) | appropriate amount |

(Composition A2: Coating with Pencil Hardness F)

| | |
|---|---|
| Fluorine-containing urethane acrylate UV-curable resin | 49.5 parts by weight |
| Pentaerythritol triacrylate | 49.5 parts by weight |
| Fine particles (monodispersed spherical crosslinked acrylic resin beads having an average particle size of 5 μm) (MX-500H, Soken Chemical & Engineering Co., Ltd.) | 1 parts by weight |
| Photoinitiator (1-hydroxycyclohexyl phenyl ketone) (Irgacure ® 184) | 1 parts by weight |
| Solvent (methyl isobutyl ketone:cyclohexanone = 1:1 weight ratio) | appropriate amount |

(Composition A3: Coating with Pencil Hardness H)

| | |
|---|---|
| Pentaerythritol triacrylate | 99 parts by weight |
| Fine particles (monodispersed spherical crosslinked acrylic resin beads having an average particle size of 5 μm) (MX-500H, Soken Chemical & Engineering Co., Ltd.) | 1 parts by weight |
| Photoinitiator (1-hydroxycyclohexyl phenyl ketone) (Irgacure ® 184) | 1 parts by weight |
| Solvent (methyl isobutyl ketone:cyclohexanone = 1:1 weight ratio) | appropriate amount |

(Composition A4: Coating with Pencil Hardness 2H)

| | |
|---|---|
| Pentaerythritol triacrylate | 49.5 parts by weight |
| Dipentaerythritol hexaacrylate | 49.5 parts by weight |
| Fine particles (monodispersed spherical crosslinked acrylic resin beads having an average particle size of 5 μm) (MX-500H, Soken Chemical & Engineering Co., Ltd.) | 1 parts by weight |
| Photoinitiator (1-hydroxycyclohexyl phenyl ketone) (Irgacure ® 184) | 1 parts by weight |
| Solvent (methyl isobutyl ketone: cyclohexanone = 1:1 weight ratio) | appropriate amount |

(Composition A5: Coating with Pencil Hardness 3H)

| | |
|---|---|
| Dipentaerythritol hexaacrylate | 99 parts by weight |
| Fine particles (monodispersed spherical crosslinked acrylic resin beads having an average particle size of 5 μm) (MX-500H, Soken Chemical & Engineering Co., Ltd.) | 1 parts by weight |
| Photoinitiator (1-hydroxycyclohexyl phenyl ketone) (Irgacure ® 184) | 1 parts by weight |
| Solvent (methyl isobutyl ketone: cyclohexanone = 1:1 weight ratio) | appropriate amount |

Example A1

An optical sheet 10 as shown in FIG. 1, which employs unit rod-like prisms as the unit optical elements 2, was produced in the following manner:

First, a cylindrical metal mold having a three-dimensional pattern, conforming to the unit rod-like prisms, formed in the mold surface was prepared. A transparent acrylic UV-curable resin solution having the following resin composition was applied onto the mold surface, and a 188-μm thick transparent biaxially-oriented polyethylene terephthalate film (PET film) was superimposed on the resin solution. The resin solution, held between the mold and the PET film, was cured by ultraviolet irradiation using a high-pressure mercury lamp, thereby producing a prism sheet member consisting of a sheet-like body portion 1 and unit rod-like prisms as the unit optical elements 2, arranged on one surface 1p of the body portion 1 with the ridge lines of the prisms parallel to each other.

[Resin Composition for the Formation of Unit Optical Elements]

| | |
|---|---|
| Prepolymer (caprolactone-modified urethane acrylate) | 11 parts by weight |
| Prepolymer (tolylene diisocyanate urethane acrylate) | 8 parts by weight |
| Bifunctional monomer (bisphenol A diacrylate) | 47 parts by weight |
| Trifunctional monomer (glycerin epoxy triacrylate) | 30 parts by weight |
| Initiator (2,4,6-trimethylbenzoyldiphenyl phosphine oxide) | 2.5 parts by weight |
| Lubricant (phosphate lubricant) | 1 parts by weight |

The body portion 1 consisted of the PET film and a portion of the cured product of the UV-curable resin solution, the portion having a thickness corresponding to the distance between the PET film and the raised portions of the mold surface. The remainder of the cured product made the unit rod-like prisms as the unit optical elements 2. The shape of the unit rod-like prisms in the main cross-section was an isosceles right triangle with an apex angle of 90°, having a base length of 50 μm and a height of 25 μm. The unit prisms were arranged at 50 μm intervals. The unit optical elements 2 consisting of the unit rod-like prisms, each having the same shape and the same dimensions, were arranged at regular intervals on the one surface 1p of the body portion 1 such that they entirely covered the one surface 1p. The outermost surface of the unit prisms was the optical element surface Pe.

Next, the above-described coating composition A2 was applied onto the other surface 1q of the body portion 1, i.e. the back surface of the prism sheet member, followed by heating/drying of the composition. Thereafter, the coating composition was cured by ultraviolet irradiation using a high-pressure mercury lamp to form a 3-μm thick uneven coating 3, thereby producing the intended optical sheet.

As a result of measurement of pencil hardness for the optical sheet obtained, the hardness He of the optical element surface Pe was found to be B, and the hardness Hm of the uneven coating surface (back surface) Pm was found to be F.

Example A2

An optical sheet was produced in the same manner as in Example A1 except for changing the coating composition, used in Example A1 for the formation of an uneven coating, to the coating composition A3.

As a result of measurement of pencil hardness for the optical sheet obtained, the hardness He of the optical element surface Pe was found to be B, and the hardness Hm of the uneven coating surface (back surface) Pm was found to be H.

Example A3

An optical sheet was produced in the same manner as in Example A1 except for changing the coating composition, used in Example A1 for the formation of an uneven coating, to the coating composition A4.

As a result of measurement of pencil hardness for the optical sheet obtained, the hardness He of the optical element surface Pe was found to be B, and the hardness Hm of the uneven coating surface (back surface) Pm was found to be 2H.

Example A4

An optical sheet was produced in the same manner as in Example A1 except for changing the coating composition, used in Example A1 for the formation of an uneven coating, to the coating composition A5.

As a result of measurement of pencil hardness for the optical sheet obtained, the hardness He of the optical element surface Pe was found to be B, and the hardness Hm of the uneven coating surface (back surface) Pm was found to be 3H.

Example A5

An optical sheet was produced in the same manner as in Example A2 except for changing the resin composition, used in Example A2 for the formation of unit optical elements, to the following resin composition:

The resin composition for the formation of unit optical elements comprises: caprolactone-modified urethane acrylate and ethylene oxide-modified biphenyloxyethyl acrylate as prepolymers; neopentyl glycol methacrylate and bisphenol A diacrylate as bifunctional monomers; glycerin epoxy triacrylate as a trifunctional monomer; bisacyl phosphine oxide and 1-hydroxycyclohexyl phenyl ketone (Irgacure® 184) as initiators; and a phosphate lubricant.

As a result of measurement of pencil hardness for the optical sheet obtained, the hardness He of the optical element surface Pe was found to be HB, and the hardness Hm of the uneven coating surface (back surface) Pm was found to be H.

Example A6

An optical sheet was produced in the same manner as in Example A5 except for changing the coating composition, used in Example A5 for the formation of an uneven coating, to the coating composition A4.

As a result of measurement of pencil hardness for the optical sheet obtained, the hardness He of the optical element surface Pe was found to be HB, and the hardness Hm of the uneven coating surface (back surface) Pm was found to be 2H.

Example A7

An optical sheet was produced in the same manner as in Example A5 except for changing the coating composition, used in Example A5 for the formation of an uneven coating, to the coating composition A5.

As a result of measurement of pencil hardness for the optical sheet obtained, the hardness He of the optical element surface Pe was found to be HB, and the hardness Hm of the uneven coating surface (back surface) Pm was found to be 3H.

Example A8

An optical sheet was produced in the same manner as in Example A5 except for changing the coating composition, used in Example A5 for the formation of an uneven coating, to the coating composition A2.

As a result of measurement of pencil hardness for the optical sheet obtained, the hardness He of the optical element surface Pe was found to be HB, and the hardness Hm of the uneven coating surface (back surface) Pm was found to be F.

Example A9

An optical sheet was produced in the same manner as in Example A5 except that instead of the resin composition used in Example A5 for the formation of unit optical elements, the composition made by eliminating the fine particles from the coating composition A3 was used as a resin composition for the formation of unit optical elements. As a result of measurement of pencil hardness for the optical sheet obtained, the hardness He of the optical element surface Pe was found to be H, and the hardness Hm of the uneven coating surface (back surface) Pm was found to be H.

Comparative Example A1

An optical sheet was produced in the same manner as in Example A1 except for changing the coating composition, used in Example A1 for the formation of an uneven coating, to the coating composition A1.

As a result of measurement of pencil hardness for the optical sheet obtained, the hardness He of the optical element surface Pe was found to be B, and the hardness Hm of the uneven coating surface (back surface) Pm was found to be HB.

Comparative Example A2

An optical sheet was produced in the same manner as in Example A5 except for changing the coating composition, used in Example A5 for the formation of an uneven coating, to the coating composition A1.

As a result of measurement of pencil hardness for the optical sheet obtained, the hardness He of the optical element surface Pe was found to be HB, and the hardness Hm of the uneven coating surface (back surface) Pm was found to be HB.

Comparative Example A3

An optical sheet was produced in the same manner as in Example A9 except for changing the coating composition, used in Example A9 for the formation of an uneven coating, to the coating composition A2.

As a result of measurement of pencil hardness for the optical sheet obtained, the hardness He of the optical element surface Pe was found to be H, and the hardness Hm of the uneven coating surface (back surface) Pm was found to be F.

Comparative Example A4

An optical sheet was produced in the same manner as in Example A5 except that instead of the resin composition used in Example A5 for the formation of unit optical elements, the composition made by eliminating the fine particles from the coating composition A4 was used as a resin composition for the formation of unit optical elements. As a result of measurement of pencil hardness for the optical sheet obtained, the hardness He of the optical element surface Pe was found to be 2H, and the hardness Hm of the uneven coating surface (back surface) Pm was found to be H.

[Performance Evaluation]

The optical sheets of Examples A1 to A9 and Comparative Examples A1 to A4 were evaluated for pencil hardness and scratch resistance. Further, measurements of Martens hardness and recovery rate were performed on the respective optical sheets. The measurement of the pencil hardness of the optical element surface Pe was carried out by moving a pencil in the prism ridge line direction.

(1) The pencil hardness was measured in accordance with MS K5600-5-4 (1999) under the conditions of a load of 1000 g and a speed of 1 mm/s.

(2) The evaluation of scratch resistance was performed in the following manner: A stack of 10 square optical sheets, each having a side length of 5 cm, was placed on a transparent acrylic resin plate. The 10 optical sheets were stacked together such that the optical element surface of each sheet faces downward and the arrangement directions of the unit optical elements, i.e. the unit rod-like prisms, of the optical sheets are parallel to each other. The same transparent acrylic resin plate was then superimposed on the stack of the 10 optical sheets, and the four sides of the stack were fixed with an adhesive tape. The pair of acrylic resin plates, with the 10 optical sheets sandwiched therebetween, was fixed on a horizontal vibrating table of a vibration tester (BF-50UL, Idex Co., Ltd.), and a 10-gram weight was placed and fixed on the upper acrylic resin plate. The assembly was subjected to three-axis vibration in the vertical and horizontal directions at vibration acceleration of 7.3 G and vibration frequency of 67Hz.

For the optical sheets after the vibration test, the surface state was observed visually under a microscope at 500-fold magnification. For the optical element surface Pe, the ridge portion of a unit rod-like prism was observed in a 3 mm-length area. For the back surface (coating surface) Pm, the surface was observed in a 9 mm$^2$ square area. The presence or absence of a scratch was determined by the observation.

To evaluate the scratch resistance of the back surface, i.e. the coating surface (uneven coating surface in research 1), the presence or absence of a scratch was determined for 5 optical sheets after the vibration test in each of the Examples and Comp. Examples. The scratch resistance of the back surface was evaluated as "excellent" when no scratch was found in the back surfaces of all the 5 optical sheets, "poor" when a scratch was found in every one of the 5 optical sheets, and "good" when a scratch was found in some of the 5 optical sheets, but not found in the other sheet(s).

To evaluate the scratch resistance of the optical element surface, the presence or absence of a scratch was determined for 5 optical sheets after the vibration test in each of the Examples and Comp. Examples. The scratch resistance of the optical element surface was evaluated as "excellent" when no scratch was found in optical element surfaces of all the 5 optical sheets, "poor" when a scratch was found in every one of the 5 optical sheets, and "good" when a scratch was found in some of the 5 optical sheets, but not found in the other sheet(s).

(3) The Martens hardness and the recovery rate were measured by using a micro hardness tester PICODENTOR® HM500 (ISO 14577-1), available from Fischer Instruments K.K.

[Performance Comparison]

Table 1 and FIG. 2 show data on the pencil hardnesses He and Hm and the scratch resistance, determined for the optical sheets of Examples A1 to A9 and Comp. Examples A1 to A4. In Table 1 and FIG. 2, the mark "○" in the column "Overall evaluation" indicates the case where the evaluation of the scratch resistance is "excellent" both for the back surface (coating surface) Pm and for the optical element surface Pe; the mark "Δ" indicates the case where the evaluation of the scratch resistance is "excellent" for the back surface (coating surface) Pm, and "good" for the optical element surface Pe; and the mark "X" indicates the case where the evaluation of the scratch resistance is "good" or "poor" for the back surface (coating surface) Pm, or "poor" for the optical element surface Pe. The symbols A to H in the column "Position on graph" in Table 1 indicate those symbols shown in FIG. 2. For example, the position "A" in Comp. Example A1, in which He=B and Hm=HB, indicates the point A of the coordinates (B, HB) in FIG. 2.

and that the hardness Hm be not less than "F" (hardness Hm≥F), the scratch resistance of the back surface Pm was found to be "excellent" and the scratch resistance of the optical element surface Pe was found to be at least "good", and the overall evaluation, which places importance on the scratch resistance of the back surface Pm, was as fine as "○" or "Δ".

However, in Examples A3, A4 and A7 in which the relation "hardness Hm−hardness He≥3" holds true, a scratch which was not considered to be practically problematic was found in the optical element surface(s) Pe of one or two optical sheets. A scratch which was not considered to be practically problematic was found in the optical element surface(s) Pe of one or two optical sheets also in Examples A8 and A9 in which "hardness Hm−hardness He" is "1" or "0". On the other hand, in Examples A1, A2, A5 and A6 which satisfy the relation "hardness He+3≥hardness Hm≥hardness He+2", the scratch resistance of the optical element surface Pe and the scratch resistance of the back surface Pm were both "excellent", and the overall evaluation was "○".

Table 2 shows the results of the measurement of the recovery rate in the Martens hardness test, together with the pencil hardness data, for some of the Examples and Comp. Examples. As can be seen in Table 2, the scratch resistance of the back surface is fine when the recovery rate is not less than 50%, whereas the scratch resistance of the back surface is inferior when the recovery rate is 41.6% (Comp. Example A1), i.e. less than 50%.

TABLE 1

Evaluation of scratch resistance (vibration test) in relationship with pencil hardnesses He and Hm of optical element surface Pe and back surface Pm

| | Position on graph | Pencil hardness | | | Scratch resistance (vibration test) | | |
|---|---|---|---|---|---|---|---|
| | | He | Hm | Hm-He | Optical element surface | Back surface | Overall evaluation |
| Ex. A1 | B | B | F | +2 | excellent | excellent | ○ |
| Ex. A2 | C | B | H | +3 | excellent | excellent | ○ |
| Ex. A3 | D | B | 2H | +4 | good | excellent | Δ |
| Ex. A4 | E | B | 3H | +5 | good | excellent | Δ |
| Ex. A5 | F | HB | H | +2 | excellent | excellent | ○ |
| Ex. A6 | G | HB | 2H | +3 | excellent | excellent | ○ |
| Ex. A7 | H | HB | 3H | +4 | good | excellent | Δ |
| Ex. A8 | I | HB | F | +1 | good | excellent | Δ |
| Ex. A9 | K | H | H | 0 | good | excellent | Δ |
| Comp. Ex. A1 | A | B | HB | +1 | good | good | X |
| Comp. Ex. A2 | J | HB | HB | 0 | good | good | X |
| Comp. Ex. A3 | L | H | F | −1 | excellent | poor | X |
| Comp. Ex. A4 | M | 2H | H | −1 | excellent | poor | X |

Back surface Pm is the surface of an uneven coating
"Hm-He" indicates a difference in hardness unit between Hm and He on the pencil hardness scale As shown in Table 1 and FIG. 2, the scratch resistance of the back surface Pm, consisting of a coating surface, was found to be "poor" in Comp. Examples A3 and A4 in which the hardness Hm of the back surface Pm is lower than the hardness He of the optical element surface Pe. The scratch resistance of the back surface Pm was not "excellent" in Comp. Examples A1 and A2 in which though the hardness Hm of the back surface Pm is not less than the hardness He of the optical element surface Pe, the hardness Hm of the back surface Pm is lower than "F". On the other hand, in Examples A1 to A9 which satisfy the requirements that the hardness Hm be not less than the hardness He (hardness Hm≥hardness He)

With reference to the Martens hardness of the back surface Pm consisting of an uneven coating surface, the scratch resistance is fine when the hardness is in the range of 100 to 180 N/mm$^2$, as shown by the data in Table 2. The scratch resistance will be inferior if the hardness is too high or too low. On the other hand, the scratch resistance of the optical element surface Pe is fine despite the fact that the Martens hardness is two orders of magnitude lower than that of the back surface Pm, as can be seen in Table 2. It may be fine for the optical element surface Pe that it can deform by an external force like willow, without strongly resisting it, and return to the original shape when released from the external force.

TABLE 2

Martens hardness and recovery rate of optical element surface Pe and back surface Pm

| | Pencil hardness (He, Hm) | Optical element surface Pe | | Back surface Pm | | Scratch resistance | |
|---|---|---|---|---|---|---|---|
| | | Martens hardness [N/mm2] | Recovery rate[%] | Martens hardness [N/mm$^2$] | Recovery rate[%] | Pe | Pm |
| Ex. A1 | (B, F) | 2.4 | 77.5 | 102.9 | 54.9 | excellent | excellent |
| Ex. A2 | (B, H) | 2.4 | 77.5 | 137.8 | 63.0 | excellent | excellent |
| Ex. A3 | (B, 2H) | 2.4 | 77.5 | 221.9 | 77.9 | good | excellent |
| Ex. A4 | (B, 3H) | 2.4 | 77.5 | — | — | good | excellent |
| Ex. A5 | (HB, H) | 3.7 | 75.7 | 178.3 | 59.2 | excellent | excellent |
| Ex. A6 | (HB, 2H) | 3.7 | 75.7 | — | — | excellent | excellent |
| Ex. A7 | (HB, 3H) | 3.7 | 75.7 | — | — | good | excellent |
| Comp. Ex. A1 | (B, HB) | 2.4 | 77.5 | 167.1 | 41.6 | good | good |

<Research 2>

Research 2 was carried out on optical sheets having the construction of FIG. 1. Thus, the optical sheets tested in research 2 each had an uneven back surface Pm consisting of the uneven surface of an uneven coating.

[Preparation of Coating Compositions for the Formation of Uneven Coatings]

The following coating compositions were prepared to form uneven coatings with varying pencil hardnesses:

(Composition B1: Coating with Pencil Hardness HB)

| | |
|---|---|
| Fluorine-containing UV-curable polymer (refractive index 1.41) (Opstar ® JN35, JSR Corporation, solid content 15 wt %, solvent methyl isobutyl ketone) | 99 parts by weight |
| Fine particles (monodispersed spherical crosslinked acrylic resin beads having an average particle size of 5 μm) (MX-500H, Soken Chemical & Engineering Co., Ltd.) | 1 parts by weight |
| Photoinitiator (1-hydroxycyclohexyl phenyl ketone) (Irgacure ® 184) | 1 parts by weight |
| Solvent (methyl isobutyl ketone: cyclohexanone = 1:1 weight ratio) | appropriate amount |

(Composition B2: Coating with Pencil Hardness F)

| | |
|---|---|
| Fluorine-containing UV-curable polymer (refractive index 1.41) (Opstar ® JN35, JSR Corporation, solid content 15 wt %, solvent methyl isobutyl ketone) | 80 parts by weight |
| Pentaerythritol triacrylate (refractive index 1.51) | 19 parts by weight |
| Fine particles (monodispersed spherical crosslinked acrylic resin beads having an average particle size of 5 μm) (MX-500H, Soken Chemical & Engineering Co. Ltd.) | 1 parts by weight |
| Photoinitiator (1-hydroxycyclohexyl phenyl ketone) (Irgacure ® 184) | 1 parts by weight |
| Solvent (methyl isobutyl ketone: cyclohexanone = 1:1 weight ratio) | appropriate amount |

(Composition B3: Coating with Pencil Hardness H)

| | |
|---|---|
| Pentaerythritol triacrylate (refractive index 1.51) | 80 parts by weight |
| UV-curable urethane acrylate oligomer (refractive index 1.52) (Shikoh ® UV1700B, The Nippon Synthetic Chemical Industry Co., Ltd.) | 19 parts by weight |
| Fine particles (monodispersed spherical crosslinked acrylic resin beads having an average particle size of 5 μm) (MX-500H, Soken Chemical & Engineering Co., Ltd.) | 1 parts by weight |
| Photoinitiator (1-hydroxycyclohexyl phenyl ketone) (Irgacure ® 184) | 1 parts by weight |
| Solvent (methyl isobutyl ketone: cyclohexanone = 1:1 weight ratio) | appropriate amount |

(Composition B4: Coating with Pencil Hardness 2H)

| | |
|---|---|
| Dipentaerythritol hexaacrylate (refractive index 1.51)(KAYARAD ® DPHA, Nippon Kayaku Co., Ltd.) | 29 parts by weight |
| UV-curable urethane acrylate oligomer (refractive index 1.52) (Shikoh ® UV1700B, The Nippon Synthetic Chemical Industry Co., Ltd.) | 70 parts by weight |
| Fine particles (monodispersed spherical crosslinked acrylic resin beads having an average particle size of 5 μm) (MX-500H, Soken Chemical & Engineering Co., Ltd.) | 1 parts by weight |
| Photoinitiator (1-hydroxycyclohexyl phenyl ketone) (Irgacure ® 184) | 1 parts by weight |
| Solvent (methyl isobutyl ketone: cyclohexanone = 1:1 weight ratio) | appropriate amount |

(Composition B5: Coating with Pencil Hardness 3H)

| | |
|---|---|
| Dipentaerythritol hexaacrylate (refractive index 1.51) (KAYARAD ® DPHA, Nippon Kayaku Co., Ltd.) | 80 parts by weight |
| UV-curable urethane acrylate oligomer (refractive index 1.52) (Shikoh ® UV1700B, The Nippon Synthetic Chemical Industry Co., Ltd.) | 19 parts by weight |
| Fine particles (monodispersed spherical crosslinked acrylic resin beads having an average particle size of 5 μm) (MX-500H, Soken Chemical & Engineering Co., Ltd.) | 1 parts by weight |
| Photoinitiator (1-hydroxycyclohexyl phenyl ketone) (Irgacure ® 184) | 1 parts by weight |
| Solvent (methyl isobutyl ketone: cyclohexanone = 1:1 weight ratio) | appropriate amount |

Example B1

An optical sheet 10 as shown in FIG. 1, which employs unit rod-like prisms as the unit optical elements 2, was produced. The shape of the unit rod-like prisms of the optical sheet was made to be the same as that of the optical sheet of Example A1. The optical sheet was produced in the same manner as in Example A1 except for changing the coating composition for the formation of an uneven coating to the composition B2. Thus, in Example B1, the unit rod-like prisms having the same shape as that of Example A1 were produced by using the same resin composition for the formation of unit optical elements as used in Example A1. As in Example A1, the resin composition for the formation of unit optical elements was coated onto a 188 μm-thick transparent biaxially-oriented polyethylene terephthalate film (PET film). The PET film has a refractive index of 1.65.

The Rz (in accordance with JIS B0601 (1994)) of the back surface, consisting of the coating surface Pm, was found to be 3.26 μm. As a result of measurement of pencil hardness for the optical sheet obtained, the hardness He of the optical element surface Pe was found to be B, and the hardness Hm of the coating surface (back surface) Pm was found to be F. The refractive index Ns of the coating-facing portion of the body portion 1 was found to be 1.65, and the refractive index Nm of the resin of the uneven coating 3 was found to be 1.47.

Example B2

An optical sheet was produced in the same manner as in Example B1 except for changing the coating composition, used in Example B1 for the formation of an uneven coating, to the coating composition B3.

As a result of measurement of pencil hardness for the optical sheet obtained, the hardness He of the optical element surface Pe was found to be B, and the hardness Hm of the coating surface (back surface) Pm was found to be H. The refractive index Ns of the coating-facing portion of the body portion 1 was found to be 1.65, and the refractive index Nm of the resin of the uneven coating 3 was found to be 1.51.

Example B3

An optical sheet was produced in the same manner as in Example B1 except for changing the coating composition, used in Example B1 for the formation of an uneven coating, to the coating composition B4.

As a result of measurement of pencil hardness for the optical sheet obtained, the hardness He of the optical element surface Pe was found to be B, and the hardness Hm of the coating surface (back surface) Pm was found to be 2H. The refractive index Nm of the resin of the uneven coating 3 was found to be 1.52.

Example B4

An optical sheet was produced in the same manner as in Example B1 except for changing the coating composition, used in Example B1 for the formation of an uneven coating, to the coating composition B5.

As a result of measurement of pencil hardness for the optical sheet obtained, the hardness He of the optical element surface Pe was found to be B, and the hardness Hm of the coating surface (back surface) Pm was found to be 3H. The refractive index Nm of the resin of the uneven coating 3 was found to be 1.51.

Example B5

An optical sheet was produced in the same manner as in Example B2 except for changing the resin composition, used in Example B2 for the formation of unit optical elements, to the following resin composition:

The resin composition for the formation of unit optical elements comprises: caprolactone-modified urethane acrylate and ethylene oxide-modified biphenyloxyethyl acrylate as prepolymers; neopentyl glycol methacrylate and bisphenol A diacrylate as bifunctional monomers; glycerin epoxy triacrylate as a trifunctional monomer; bisacyl phosphine oxide and 1-hydroxycyclohexyl phenyl ketone (Irgacure® 184) as initiators; and a phosphate lubricant. As a result of measurement of pencil hardness for the optical sheet obtained, the hardness He of the optical element surface Pe was found to be HB, and the hardness Hm of the coating surface (back surface) Pm was found to be H. The refractive index Ns of the coating-facing portion of the body portion 1 was found to be 1.65, while the refractive index Nm of the resin of the uneven coating 3 was found to be 1.51.

Example B6

An optical sheet was produced in the same manner as in Example B5 except for changing the coating composition, used in Example B5 for the formation of an uneven coating, to the coating composition B4.

As a result of measurement of pencil hardness for the optical sheet obtained, the hardness He of the optical element surface Pe was found to be HB, and the hardness Hm of the coating surface (back surface) Pm was found to be 2H. The refractive index Nm of the resin of the uneven coating 3 was found to be 1.52.

Example B7

An optical sheet was produced in the same manner as in Example B5 except for changing the coating composition, used in Example B5 for the formation of an uneven coating, to the coating composition B5.

As a result of measurement of pencil hardness for the optical sheet obtained, the hardness He of the optical element surface Pe was found to be HB, and the hardness Hm of the coating surface (back surface) Pm was found to be 3H. The refractive index Nm of the resin of the uneven coating 3 was found to be 1.51.

Example B8

An optical sheet was produced in the same manner as in Example B5 except for changing the coating composition, used in Example B5 for the formation of an uneven coating, to the coating composition B2.

As a result of measurement of pencil hardness for the optical sheet obtained, the hardness He of the optical element surface Pe was found to be HB, and the hardness Hm of the uneven coating surface (back surface) Pm was found to be F. The refractive index Nm of the resin of the uneven coating 3 was found to be 1.47.

Example B9

An optical sheet was produced in the same manner as in Example B5 except that instead of the resin composition used in Example B5 for the formation of unit optical elements, the composition made by eliminating the fine particles from the coating composition B3 was used as a resin composition for the formation of unit optical elements.

As a result of measurement of pencil hardness for the optical sheet obtained, the hardness He of the optical element surface Pe was found to be H, and the hardness Hm of the uneven coating surface (back surface) Pm was found to be H. The refractive index Nm of the resin of the uneven coating 3 was found to be 1.51.

Comparative Example B1

An optical sheet was produced in the same manner as in Example B1 except for changing the coating composition, used in Example B1 for the formation of an uneven coating, to the coating composition B1.

As a result of measurement of pencil hardness for the optical sheet obtained, the hardness He of the optical element surface Pe was found to be B, and the hardness Hm of the coating surface (back surface) Pm was found to be HB. The refractive index Nm of the resin of the uneven coating 3 was found to be 1.41.

Comparative Example B2

An optical sheet was produced in the same manner as in Example B5 except for changing the coating composition, used in Example B5 for the formation of an uneven coating, to the coating composition B1.

As a result of measurement of pencil hardness for the optical sheet obtained, the hardness He of the optical element surface Pe was found to be HB, and the hardness Hm of the uneven coating surface (back surface) Pm was found to be HB. The refractive index Nm of the resin of the uneven coating 3 was found to be 1.41.

Comparative Example B3

An optical sheet was produced in the same manner as in Example B9 except for changing the coating composition, used in Example B9 for the formation of an uneven coating, to the coating composition B2.

As a result of measurement of pencil hardness for the optical sheet obtained, the hardness He of the optical element surface Pe was found to be H, and the hardness Hm of the uneven coating surface (back surface) Pm was found to be F. The refractive index Nm of the resin of the uneven coating 3 was found to be 1.47.

Comparative Example B4

An optical sheet was produced in the same manner as in Example B5 except that instead of the resin composition used in Example B5 for the formation of unit optical elements, the composition made by eliminating the fine particles from the coating composition B4 was used as a resin composition for the formation of unit optical elements.

As a result of measurement of pencil hardness for the optical sheet obtained, the hardness He of the optical element surface Pe was found to be 2H, and the hardness Hm of the uneven coating surface (back surface) Pm was found to be H. The refractive index Nm of the resin of the uneven coating 3 was found to be 1.51.

Comparative Example E1

An optical sheet was produced in the same manner as in Example B1 except that the uneven coating 3 was not formed. Thus, the optical sheet produced consists of the body portion 1 and the unit optical elements 2, and the back surface of the optical sheet, opposite from the optical element surface, consists of the other surface (opposite from the surface on which the unit optical elements 2 are formed) of the body portion 1.

Comparative Example E2

An optical sheet was produced in the same manner as in Example B5 except that the uneven coating 3 was not formed. Thus, the optical sheet produced consists of the body portion 1 and the unit optical elements 2, and the back surface of the optical sheet, opposite from the optical element surface, consists of the other surface (opposite from the surface on which the unit optical elements 2 are formed) of the body portion 1.

[Performance Evaluation]

The optical sheets of Examples B1 to B9 and Comparative Examples B1 to B4 were evaluated for pencil hardness and scratch resistance. Further, the optical sheets of Examples B1 to B7 and Comparative Examples B1, B2, E1 and E2 were evaluated for luminance. The measurement of the pencil hardness of the optical element surface Pe was carried out by moving a pencil in the prism ridge line direction.

(1) The pencil hardness was measured in the same manner as in Examples A1 to A9 and Comp. Examples A1 to A4.

(2) The scratch resistance was evaluated in the same manner as in Examples A1 to A9 and Comp. Examples A1 to A4.

(3) The measurement of luminance was carried out in the following manner: An edge-light type surface light source device (the outermost surface is the surface of a light guide plate) was taken out of a liquid crystal television receiver (UN40B6000VF, manufactured by Samsung Electronics Co., Ltd.) by removing a liquid crystal panel and various optical members from the screen side. The optical sheets of Examples B1 to B7 and Comparative Examples B1, B2, E1 and E2 were each placed on the light exit surface (on the light guide plate) with the back surface (coating surface) Pm facing toward the light guide plate, and the luminance in the normal direction of the light guide plate was measured by using a luminance meter (BM-7, manufactured by Topcon Corporation). With reference to the optical sheets of Comp. Example B1 and Examples B1 to B4, the luminance was evaluated in terms of the percentage relative to the luminance of the optical sheet of Comp. Example E1 which uses the same resin for the unit optical elements 2 as Examples B1 to B4, but has no coating. With reference to the optical sheets of Comp. Example B2 and Examples B5 to B8, the luminance was evaluated in terms of the percentage relative to the luminance of the optical sheet of Comp. Example E2 which uses the same resin for the unit optical elements 2 as Examples B5 to B8, but has no coating.

[Performance Comparison]

Table 3 shows data on the pencil hardnesses He and Hm, the scratch resistance, the refractive index of coating and the front direction luminance, determined for the optical sheets of Examples B1 to B9 and Comp. Examples B1 to B4, E1 and E2.

TABLE 3

Evaluation of scratch resistance (vibration test) in relationship with
pencil hardnesses He and Hm of optical element surface Pe and back surface
Pm, and the results of measurement of luminance and coating refractive index

|  | Position on graph | Pencil hardness | | | Scratch resistance (vibration test) | | | Coating refractive index | Luminance (%) |
| --- | --- | --- | --- | --- | --- | --- | --- | --- | --- |
|  |  | He | Hm | Hm-He | Optical element surface | Back surface | Overall evaluation |  |  |
| Ex. B1 | B | B | F | +2 | excellent | excellent | ○ | 1.47 | 102 |
| Ex. B2 | C | B | H | +3 | excellent | excellent | ○ | 1.51 | 101 |
| Ex. B3 | D | B | 2H | +4 | good | excellent | Δ | 1.52 | 101 |
| Ex. B4 | E | B | 3H | +5 | good | excellent | Δ | 1.51 | 101 |
| Ex. B5 | F | HB | H | +2 | excellent | excellent | ○ | 1.51 | 101 |
| Ex. B6 | G | HB | 2H | +3 | excellent | excellent | ○ | 1.52 | 101 |
| Ex. B7 | H | HB | 3H | +4 | good | excellent | Δ | 1.51 | 101 |
| Ex. B8 | I | HB | F | +1 | good | excellent | Δ | — | — |
| Ex. B9 | K | H | H | 0 | good | excellent | Δ | — | — |
| Comp. Ex. B1 | A | B | HB | +1 | good | good | X | 1.41 | 103 |
| Comp. Ex. B2 | J | HB | HB | 0 | good | good | X | 1.41 | 103 |
| Comp. Ex. B3 | L | H | F | −1 | excellent | poor | X | — | — |
| Comp. Ex. B4 | M | 2H | H | −1 | excellent | poor | X | — | — |
| Comp. Ex. E1 | — | B | — | — | — | — | — | — | 100 |
| Comp. Ex. E2 | — | HB | — | — | — | — | — | — | 100 |

Back surface Pm is the surface of an uneven coating
"Hm-He" indicates a difference in hardness unit between Hm and He on the pencil hardness scale In Examples B1 to B9 and Comp. Examples B1 to B4, the relationship of the scratch resistance with the hardness Hm of the back surface Pm, consisting of a coating surface, and the hardness He of the optical element surface Pe, was the same as the relationship in Examples A1 to A9 and Comp. Examples A1 to A4, shown in Table 1 and FIG. 2.

In particular, as shown in Table 3 and FIG. 2, the scratch resistance of the back surface Pm, consisting of a coating surface, was found to be "poor" in Comp. Examples B3 and B4 in which the hardness Hm of the back surface Pm is lower than the hardness He of the optical element surface Pe. The scratch resistance of the back surface Pm was not "excellent" in Comp. Examples B1 and B2 in which though the hardness Hm of the back surface Pm is not less than the hardness He of the optical element surface Pe, the hardness Hm of the back surface Pm is lower than "F". On the other hand, in Examples B1 to B9 which satisfy the requirements that the hardness Hm be not less than the hardness He (hardness Hm≥hardness He) and that the hardness Hm be not less than "F" (hardness Hm≥F), the scratch resistance of the back surface Pm was found to be "excellent" and the scratch resistance of the optical element surface Pe was found to be at least "good", and the overall evaluation, which places importance on the scratch resistance of the back surface Pm, was as fine as "○" or "Δ".

However, in Examples B3, B4 and B7 in which the relation "hardness Hm−hardness He>3" holds true, a scratch which was not considered to be practically problematic was found in the optical element surface(s) Pe of one or two optical sheets. A scratch which was not considered to be practically problematic was found in the optical element surface(s) Pe of one or two optical sheets also in Examples B8 and B9 in which "hardness Hm−hardness He" is "1" or "0". On the other hand, in Examples B1, B2, B5 and B6 which satisfy the relation "hardness He+3≥hardness Hm≥hardness He+2", the scratch resistance of the optical element surface Pe and the scratch resistance of the back surface Pm were both "excellent", and the overall evaluation was "○".

(Evaluation of Luminance)

As shown in Table 3, in the optical sheets of Examples B1 to B8 and Comp. Examples B1 and B2, each having a coating composed of a resin whose refractive index is lower than the refractive index 1.65 of the coating 3-facing portion (PET film) of the body portion 1, the luminance exceeds 100%, i.e. higher than the luminance (100%) of the optical sheets of Comp. Examples E1 and E2 which have no coating.

<Research 3>

Research 3 was carried out on optical sheets having the construction of FIG. 3. Thus, the optical sheets tested in research 3 each had a smooth back surface Pm consisting of the surface of a smooth coating (scratch-resistant coating).

[Preparation of Coating Compositions for the Formation of Smooth Coatings]

The following coating compositions were prepared to form smooth coatings with varying pencil hardnesses:

(Composition C1: Coating with Pencil Hardness Hb)

| | |
| --- | --- |
| Fluorine-containing UV-curable polymer (refractive index 1.41) (Opstar ® JN35, JSR Corporation, solid content 15 wt %, solvent methyl isobutyl ketone) | 100 parts by weight |
| Photoinitiator (1-hydroxycyclohexyl phenyl ketone) (Irgacure ® 184) | 1 parts by weight |
| Solvent (methyl isobutyl ketone: cyclohexanone = 1:1 weight ratio) | appropriate amount |

(Composition C2: Coating with Pencil Hardness F)

| | |
| --- | --- |
| Fluorine-containing UV-curable polymer (refractive index 1.41) (Opstar ® JN35, JSR Corporation, solid content 15 wt %, solvent methyl isobutyl ketone) | 80 parts by weight |
| Pentaerythritol triacrylate (refractive index 1.51) | 20 parts by weight |
| Photoinitiator (1-hydroxycyclohexyl phenyl ketone) (Irgacure ® 184) | 1 parts by weight |

-continued

| | |
|---|---|
| Solvent (methyl isobutyl ketone: cyclohexanone = 1:1 weight ratio) | appropriate amount |

(Composition C3: Coating with Pencil Hardness H)

| | |
|---|---|
| Pentaerythritol triacrylate (refractive index 1.51) | 80 parts by weight |
| UV-curable urethane acrylate oligomer (refractive index 1.52) (Shikoh ® UV1700B, The Nippon Synthetic Chemical Industry Co., Ltd.) | 20 parts by weight |
| Photoinitiator (1-hydroxycyclohexyl phenyl ketone) (Irgacure ® 184) | 1 parts by weight |
| Solvent (methyl isobutyl ketone: cyclohexanone = 1:1 weight ratio) | appropriate amount |

(Composition C4: Coating with Pencil Hardness 2H)

| | |
|---|---|
| Dipentaerythritol hexaacrylate (refractive index 1.51) (KAYARAD ® DPHA, Nippon Kayaku Co., Ltd.) | 30 parts by weight |
| UV-curable urethane acrylate oligomer (refractive index 1.52) (Shikoh ® UV1700B, The Nippon Synthetic Chemical Industry Co., Ltd.) | 70 parts by weight |
| Photoinitiator (1-hydroxycyclohexyl phenyl ketone) (Irgacure ® 184) | 1 parts by weight |
| Solvent (methyl isobutyl ketone: cyclohexanone = 1:1 weight ratio) | appropriate amount |

(Composition C5: Coating with Pencil Hardness 3H)

| | |
|---|---|
| Dipentaerythritol hexaacrylate (refractive index 1.51) (KAYARAD ® DPHA, Nippon Kayaku Co., Ltd.) | 80 parts by weight |
| UV-curable urethane acrylate oligomer (refractive index 1.52) (Shikoh ® UV1700B, The Nippon Synthetic Chemical Industry Co., Ltd.) | 20 parts by weight |
| Photoinitiator (1-hydroxycyclohexyl phenyl ketone) (Irgacure ® 184) | 1 parts by weight |
| Solvent (methyl isobutyl ketone: cyclohexanone = 1:1 weight ratio) | appropriate amount |

Example C1

An optical sheet was produced in the same manner as in Example B1 except that the coating composition, used in Example B1 for the formation of an uneven coating, was changed to the coating composition C2 to form a smooth coating 4.

As a result of measurement of pencil hardness for the optical sheet obtained, the hardness He of the optical element surface Pe was found to be B, and the hardness Hm of the coating surface (back surface) Pm was found to be F. The refractive index Ns of the coating-facing portion of the body portion 1 was found to be 1.65, and the refractive index Nm of the resin of the smooth coating 4 was found to be 1.47.

The Rz (in accordance with JIS B0601 (1994)) of the coating surface Pm was found to be 0.16 µm.

Example C2

An optical sheet was produced in the same manner as in Example C1 except for changing the coating composition, used in Example C1 for the formation of a smooth coating, to the coating composition C3.

As a result of measurement of pencil hardness for the optical sheet obtained, the hardness He of the optical element surface Pe was found to be B, and the hardness Hm of the coating surface (back surface) Pm was found to be H. The refractive index Ns of the coating-facing portion of the body portion 1 was found to be 1.65, and the refractive index Nm of the resin of the smooth coating 4 was found to be 1.51.

Example C3

An optical sheet was produced in the same manner as in Example C1 except for changing the coating composition, used in Example C1 for the formation of a smooth coating, to the coating composition C4.

As a result of measurement of pencil hardness for the optical sheet obtained, the hardness He of the optical element surface Pe was found to be B, and the hardness Hm of the coating surface (back surface) Pm was found to be 2H. The refractive index Nm of the resin of the smooth coating 4 was found to be 1.52.

Example C4

An optical sheet was produced in the same manner as in Example C1 except for changing the coating composition, used in Example C1 for the formation of a smooth coating, to the coating composition C5.

As a result of measurement of pencil hardness for the optical sheet obtained, the hardness He of the optical element surface Pe was found to be B, and the hardness Hm of the coating surface (back surface) Pm was found to be 3H. The refractive index Nm of the resin of the smooth coating 4 was found to be 1.51.

Example C5

An optical sheet was produced in the same manner as in Example C2 except for changing the resin composition, used in Example C2 for the formation of unit optical elements, to the following resin composition:

The resin composition for the formation of unit optical elements comprises: caprolactone-modified urethane acrylate and ethylene oxide-modified biphenyloxyethyl acrylate as prepolymers; neopentyl glycol methacrylate and bisphenol A diacrylate as bifunctional monomers; glycerin epoxy triacrylate as a trifunctional monomer; bisacyl phosphine oxide and 1-hydroxycyclohexyl phenyl ketone (Irgacure® 184) as initiators; and a phosphate lubricant. As a result of measurement of pencil hardness for the optical sheet obtained, the hardness He of the optical element surface Pe was found to be HB, and the hardness Hm of the coating surface (back surface) Pm was found to be H. The refractive index Ns of the coating-facing portion of the body portion 1 was found to be 1.65, while the refractive index Nm of the resin of the smooth coating 4 was found to be 1.51.

Example C6

An optical sheet was produced in the same manner as in Example C5 except for changing the coating composition, used in Example C5 for the formation of a smooth coating, to the coating composition C4.

As a result of measurement of pencil hardness for the optical sheet obtained, the hardness He of the optical element surface Pe was found to be HB, and the hardness Hm of the coating surface (back surface) Pm was found to be 2H. The refractive index Nm of the resin of the smooth coating 4 was found to be 1.52.

Example C7

An optical sheet was produced in the same manner as in Example C5 except for changing the coating composition, used in Example C5 for the formation of a smooth coating, to the coating composition C5.

As a result of measurement of pencil hardness for the optical sheet obtained, the hardness He of the optical element surface Pe was found to be HB, and the hardness Hm of the coating surface (back surface) Pm was found to be 3H. The refractive index Nm of the resin of the smooth coating 4 was found to be 1.51.

Example C8

An optical sheet was produced in the same manner as in Example C5 except for changing the coating composition, used in Example C5 for the formation of a smooth coating, to the coating composition C2.

As a result of measurement of pencil hardness for the optical sheet obtained, the hardness He of the optical element surface Pe was found to be HB, and the hardness Hm of the coating surface (back surface) Pm was found to be F. The refractive index Nm of the resin of the smooth coating 4 was found to be 1.47.

Example C9

An optical sheet was produced in the same manner as in Example C5 except that instead of the resin composition used in Example C5 for the formation of unit optical elements, the coating composition C3 was used as a resin composition for the formation of unit optical elements.

As a result of measurement of pencil hardness for the optical sheet obtained, the hardness He of the optical element surface Pe was found to be H, and the hardness Hm of the coating surface (back surface) Pm was found to be H. The refractive index Nm of the resin of the smooth coating 4 was found to be 1.51.

Comparative Example C1

An optical sheet was produced in the same manner as in Example C1 except for changing the coating composition, used in Example C1 for the formation of a smooth coating, to the coating composition C1.

As a result of measurement of pencil hardness for the optical sheet obtained, the hardness He of the optical element surface Pe was found to be B, and the hardness Hm of the coating surface (back surface) Pm was found to be HB. The refractive index Nm of the resin of the smooth coating 4 was found to be 1.41.

Comparative Example C2

An optical sheet was produced in the same manner as in Example C5 except for changing the coating composition, used in Example C5 for the formation of a smooth coating, to the coating composition C1.

As a result of measurement of pencil hardness for the optical sheet obtained, the hardness He of the optical element surface Pe was found to be HB, and the hardness Hm of the coating surface (back surface) Pm was found to be HB. The refractive index Nm of the resin of the smooth coating 4 was found to be 1.41.

Comparative Example C3

An optical sheet was produced in the same manner as in Example C9 except for changing the coating composition, used in Example B9 for the formation of a smooth coating, to the coating composition C2.

As a result of measurement of pencil hardness for the optical sheet obtained, the hardness He of the optical element surface Pe was found to be H, and the hardness Hm of the coating surface (back surface) Pm was found to be F. The refractive index Nm of the resin of the smooth coating 4 was found to be 1.47.

Comparative Example C4

An optical sheet was produced in the same manner as in Example C5 except that instead of the resin composition used in Example C5 for the formation of unit optical elements, the coating composition C4 was used as a resin composition for the formation of unit optical elements.

As a result of measurement of pencil hardness for the optical sheet obtained, the hardness He of the optical element surface Pe was found to be 2H, and the hardness Hm of the coating surface (back surface) Pm was found to be H. The refractive index Nm of the resin of the smooth coating 4 was found to be 1.51.

[Performance Evaluation]

The optical sheets of Examples C1 to C9 and Comparative Examples C1 to C4 were evaluated for pencil hardness and scratch resistance. Further, the optical sheets of Examples C1 to C7 and Comparative Examples C1 and C2 were evaluated for luminance. The measurement of the pencil hardness of the optical element surface Pe was carried out by moving a pencil in the prism ridge line direction.

(1) The pencil hardness was measured in the same manner as in Examples A1 to A9 and Comp. Examples A1 to A4.

(2) The scratch resistance was evaluated in the same manner as in Examples A1 to A9 and Comp. Examples A1 to A4.

(3) The luminance was evaluated in the same manner as in Examples B1 to B7 and Comp. Examples B1 and B2. With reference to the optical sheets of Comp. Example C1 and Examples C1 to C4, the luminance was evaluated in terms of the percentage relative to the luminance of the optical sheet of Comp. Example E1 (research 2) which uses the same resin for the unit optical elements 2 as Examples C1 to C4, but has no coating. With reference to the optical sheets of Comp. Example C2 and Examples C5 to C8, the luminance was evaluated in terms of the percentage relative to the luminance of the optical sheet of Comp. Example E2 (research 2) which uses the same resin for the unit optical elements 2 as Examples C5 to C8, but has no coating.

[Performance Comparison]

Table 4 shows data on the pencil hardnesses He and Hm, the scratch resistance, the refractive index of coating and the front direction luminance, determined for the optical sheets of Examples C1 to C9 and Comp. Examples C1 to C4.

TABLE 4

Evaluation of scratch resistance (vibration test) in relationship with
pencil hardnesses He and Hm of optical element surface Pe and back surface
Pm, and the results of measurement of luminance and coating refractive index

| | Position on graph | Pencil hardness | | | Scratch resistance (vibration test) | | | Coating refractive index | Luminance (%) |
| --- | --- | --- | --- | --- | --- | --- | --- | --- | --- |
| | | He | Hm | Hm-He | Optical element surface | Back surface | Overall evaluation | | |
| Ex. C1 | B | B | F | +2 | excellent | excellent | ○ | 1.47 | 102 |
| Ex. C2 | C | B | H | +3 | excellent | excellent | ○ | 1.51 | 101 |
| Ex. C3 | D | B | 2H | +4 | good | excellent | Δ | 1.52 | 101 |
| Ex. C4 | E | B | 3H | +5 | good | excellent | Δ | 1.51 | 101 |
| Ex. C5 | F | HB | H | +2 | excellent | excellent | ○ | 1.51 | 101 |
| Ex. C6 | G | HB | 2H | +3 | excellent | excellent | ○ | 1.52 | 101 |
| Ex. C7 | H | HB | 3H | +4 | good | excellent | Δ | 1.51 | 101 |
| Ex. C8 | I | HB | F | +1 | good | excellent | Δ | — | — |
| Ex. C9 | K | H | H | 0 | good | excellent | Δ | — | — |
| Comp. Ex. C1 | A | B | HB | +1 | good | good | X | 1.41 | 103 |
| Comp. Ex. C2 | J | HB | HB | 0 | good | good | X | 1.41 | 103 |
| Comp. Ex. C3 | L | H | F | −1 | excellent | poor | X | — | — |
| Comp. Ex. C4 | M | 2H | H | −1 | excellent | poor | X | — | — |

Back surface Pm is the surface of a smooth coating
"Hm-He" indicates a difference in hardness unit between Hm and He on the pencil hardness scale In Examples C1 to C9 and Comp. Examples C1 to C4, the relationship of the scratch resistance with the hardness Hm of the back surface Pm, consisting of a coating surface, and the hardness He of the optical element surface Pe, was the same as the relationship in Examples A1 to A9 and Comp. Examples A1 to A4, shown in Table 1 and FIG. 2.

In particular, as shown in Table 4 and FIG. 2, the scratch resistance of the back surface Pm, consisting of a coating surface, was found to be "poor" in Comp. Examples C3 and C4 in which the hardness Hm of the back surface Pm is lower than the hardness He of the optical element surface Pe. The scratch resistance of the back surface Pm was not "excellent" in Comp. Examples C1 and C2 in which though the hardness Hm of the back surface Pm is not less than the hardness He of the optical element surface Pe, the hardness Hm of the back surface Pm is lower than "F". On the other hand, in Examples C1 to C9 which satisfy the requirements that the hardness Hm be not less than the hardness He (hardness Hm≥hardness He) and that the hardness Hm be not less than "F" (hardness Hm≥F), the scratch resistance of the back surface Pm was found to be "excellent" and the scratch resistance of the optical element surface Pe was found to be at least "good", and the overall evaluation, which places importance on the scratch resistance of the back surface Pm, was as fine as "○" or "Δ".

However, in Examples C3, C4 and C7 in which the relation "hardness Hm−hardness He>3" holds true, a scratch which was not considered to be practically problematic was found in the optical element surface(s) Pe of one or two optical sheets. A scratch which was not considered to be practically problematic was found in the optical element surface(s) Pe of one or two optical sheets also in Examples C8 and C9 in which "hardness Hm−hardness He" is "1" or "0". On the other hand, in Examples C1, C2, C5 and C6 which satisfy the relation "hardness He+3≥hardness Hm≥hardness He+2", the scratch resistance of the optical element surface Pe and the scratch resistance of the back surface Pm were both "excellent", and the overall evaluation was "○".

(Evaluation of Luminance)

As shown in Table 4, in the optical sheets of Examples C1 to C7 and Comp. Examples C1 and C2, each having a coating composed of a resin whose refractive index is lower than the refractive index 1.65 of the coating 4-facing portion (PET film) of the body portion 1, the luminance exceeds 100%, i.e. higher than the luminance (100%) of the optical sheets of Comp. Examples E1 and E2 which have no coating.

<Research 4>

Research 4 was carried out on optical sheets having the construction of FIG. 8. Thus, the optical sheets tested in research 4 each had a smooth back surface Pm consisting of the other surface 1q of the body portion 1.

[Preparation of Transparent Resin Sheets as Body Portions]

The following 200-μm thick resin sheets were prepared as transparent resin sheets with varying pencil hardnesses:
(Resin Sheet a: Pencil Hardness 2B)
Acrylic resin (HBS006, Mitsubishi Rayon Co., Ltd.)
(Resin Sheet B: Pencil Hardness B)
Polycarbonate resin (CALIBRE® 301-40, Sumitomo Dow Limited)
(Resin Sheet C: Pencil Hardness Hb)
Polycarbonate resin (CALIBRE® 301-10, Sumitomo Dow Limited)
(Resin Sheet D: Pencil Hardness F)
Acrylic resin (HBS006: HBXN47=2:1 weight ratio, Mitsubishi Rayon Co., Ltd.)
(Resin Sheet E: Pencil Hardness H)
Acrylic resin (HBXN47, Mitsubishi Rayon Co., Ltd.)

Example D1

An optical sheet 10 as shown in FIG. 8, which employs unit rod-like prisms as the unit optical elements 2, was produced in the following manner:

First, a cylindrical metal mold having a three-dimensional pattern, conforming to the unit rod-like prisms, formed in the mold surface was prepared. The mold was the same as the mold used to produce the unit optical elements of the optical sheet of Example A1. A transparent acrylic UV-curable resin solution having the following resin composition A was applied onto the mold surface, and the above-described 200-μm thick resin sheet B was superimposed on the resin solution. The resin solution, held between the mold and the resin sheet, was cured by ultraviolet irradiation using a high-pressure mercury lamp, thereby producing an optical sheet consisting of a sheet-like body portion 1 and unit rod-like prisms as the unit optical elements 2, arranged on one surface 1p of the body portion 1 with the ridge lines of the prisms parallel to each other.

[Resin Composition A for the Formation of Unit Optical Elements]

| | |
|---|---|
| Prepolymer (caprolactone-modified urethane acrylate) | 10 parts by weight |
| Prepolymer (tolylene diisocyanate urethane acrylate) | 8 parts by weight |
| Bisphenol A diacrylate (modified with 4 mols EO) (bifunctional monomer) | 48 parts by weight |
| Isocianurate triacrylate (modified with 3 mols EO) (trifunctional monomer) | 30 parts by weight |
| Initiator (2,4,6-trimethylbenzoyldiphenyl phosphine oxide) | 3 parts by weight |
| Lubricant (phosphate lubricant) | 1 parts by weight |

The body portion 1 consisted of the resin sheet B and a portion (land portion) of the cured product of the UV-curable resin solution, the land portion having a thickness corresponding to the distance between the resin sheet and the raised portions of the mold surface. The remainder of the cured product made the unit rod-like prisms as the unit optical elements 2. The shape of the unit rod-like prisms in the main cross-section was an isosceles right triangle with an apex angle of 90°, having a base length of 50 μm and a height of 25 μm. The unit prisms were arranged at 50 μm intervals. The unit optical elements 2 consisting of the unit rod-like prisms, each having the same shape and the same dimensions, are arranged at regular intervals on the one surface 1p of the body portion 1 such that they entirely covered the one surface ip. The outermost surface of the unit prisms was the optical element surface Pe. On the other hand, the back surface of the optical sheet was the other surface 1q of the body portion 1, i.e. the surface of the resin sheet B.

As a result of measurement of pencil hardness for the optical sheet obtained, the hardness He of the optical element surface Pe was found to be 3B, and the hardness Hm of the back surface Pm was found to be B.

Example D2

An optical sheet was produced in the same manner as in Example D1 except for changing the resin sheet B used in Example D1 to the resin sheet C.

As a result of measurement of pencil hardness for the optical sheet obtained, the hardness He of the optical element surface Pe was found to be 3B, and the hardness Hm of the back surface Pm was found to be HB.

Example D3

An optical sheet was produced in the same manner as in Example D1 except for changing the resin sheet B used in Example D1 to the resin sheet D.

As a result of measurement of pencil hardness for the optical sheet obtained, the hardness He of the optical element surface Pe was found to be 3B, and the hardness Hm of the back surface Pm was found to be F.

Example D4

An optical sheet was produced in the same manner as in Example D1 except for changing the resin sheet B used in Example D1 to the resin sheet E.

As a result of measurement of pencil hardness for the optical sheet obtained, the hardness He of the optical element surface Pe was found to be 3B, and the hardness Hm of the back surface Pm was found to be H.

Example D5

An optical sheet was produced in the same manner as in Example D2 except for changing the resin composition A, used in Example D2 for the formation of unit optical elements, to the following resin composition B.

As a result of measurement of pencil hardness for the optical sheet obtained, the hardness He of the optical element surface Pe was found to be 2B, and the hardness Hm of the back surface Pm was found to be HB.

[Resin Composition B for the Formation of Unit Optical Elements]

| | |
|---|---|
| Prepolymer (caprolactone-modified urethane acrylate) | 20 parts by weight |
| Prepolymer (tolylene diisocyanate urethane acrylate) | 8 parts by weight |
| Bisphenol A diacrylate (modified with 4 mols EO) (bifunctional monomer) | 38 parts by weight |
| Isocianurate triacrylate (modified with 3 mols EO) (trifunctional monomer) | 30 parts by weight |
| Initiator (2,4,6-trimethylbenzoyldiphenyl phosphine oxide) | 3 parts by weight |
| Lubricant (phosphate lubricant) | 1 parts by weight |

Example D6

An optical sheet was produced in the same manner as in Example D3 except for changing the resin composition A, used in Example D3 for the formation of unit optical elements, to the resin composition B.

As a result of measurement of pencil hardness for the optical sheet obtained, the hardness He of the optical element surface Pe was found to be 2B, and the hardness Hm of the back surface Pm was found to be F.

Example D7

An optical sheet was produced in the same manner as in Example D4 except for changing the resin composition A, used in Example D4 for the formation of unit optical elements, to the resin composition B.

As a result of measurement of pencil hardness for the optical sheet obtained, the hardness He of the optical element surface Pe was found to be 2B, and the hardness Hm of the back surface Pm was found to be H.

Example D8

An optical sheet was produced in the same manner as in Example D1 except for changing the resin composition A, used in Example D1 for the formation of unit optical elements, to the resin composition B.

As a result of measurement of pencil hardness for the optical sheet obtained, the hardness He of the optical element surface Pe was found to be 2B, and the hardness Hm of the back surface Pm was found to be B.

Example D9

An optical sheet was produced in the same manner as in Example D2 except that instead of the resin composition A used in Example D2 for the formation of unit optical elements, the above-described composition C1, used in research 3 for the formation of a smooth coating, was used to form the unit optical elements.

As a result of measurement of pencil hardness for the optical sheet obtained, the hardness He of the optical element surface Pe was found to be HB, and the hardness Hm of the back surface Pm was found to be HB.

Comparative Example D1

An optical sheet was produced in the same manner as in Example D1 except for changing the resin sheet B used in Example D1 to the resin sheet A.

As a result of measurement of pencil hardness for the optical sheet obtained, the hardness He of the optical element surface Pe was found to be 3B, and the hardness Hm of the back surface Pm was found to be 2B.

Comparative Example D2

An optical sheet was produced in the same manner as in Comp. Example D1 except for changing the resin composition A, used in Comp. Example D1 for the formation of unit optical elements, to the resin composition B.

As a result of measurement of pencil hardness for the optical sheet obtained, the hardness He of the optical element surface Pe was found to be 2B, and the hardness Hm of the back surface Pm was found to be 2B.

Comparative Example D3

An optical sheet was produced in the same manner as in Example D1 except that instead of the resin composition A used in Example D1 for the formation of unit optical elements, the above-described composition C1, used in research 3 for the formation of a smooth coating, was used to form the unit optical elements.

As a result of measurement of pencil hardness for the optical sheet obtained, the hardness He of the optical element surface Pe was found to be HB, and the hardness Hm of the back surface Pm was found to be B.

Comparative Example D4

An optical sheet was produced in the same manner as in Example D2 except that instead of the resin composition A used in Example D2 for the formation of unit optical elements, the above-described composition C2, used in research 3 for the formation of a smooth coating, was used to form the unit optical elements.

As a result of measurement of pencil hardness for the optical sheet obtained, the hardness He of the optical element surface Pe was found to be F, and the hardness Hm of the back surface Pm was found to be HB.

The optical sheets of Examples D1 to D9 and Comparative Examples D1 to D4 were evaluated for pencil hardness and scratch resistance. The measurement of the pencil hardness of the optical element surface Pe was carried out by moving a pencil in the prism ridge line direction.

(1) The pencil hardness was measured in accordance with JIS K5600-5-4 (1999) under the conditions of a load of 1000 g and a speed of 1 mm/s.

(2) The evaluation of scratch resistance was performed in the following manner: A stack of 10 square optical sheets, each having a side length of 5 cm, was placed on a transparent acrylic resin plate. The 10 optical sheets were stacked together such that the optical element surface of each sheet faces downward and the arrangement directions of the unit optical elements, i.e. the unit rod-like prisms, of the optical sheets are parallel to each other. The same transparent acrylic resin plate was then superimposed on the stack of the ten optical sheets, and the four sides of the stack were fixed with an adhesive tape. The pair of acrylic resin plates, with the 10 optical sheets sandwiched therebetween, was fixed on a horizontal vibrating table of a vibration tester (BF-50UL, Idex Co., Ltd.), and a 10-gram weight was placed and fixed on the upper acrylic resin plate. The assembly was subjected to three-axis vibration in the vertical and horizontal directions at vibration acceleration of 7.3 G and vibration frequency of 67 Hz.

For the optical sheets after the vibration test, the surface state was observed visually under a microscope at 500-fold magnification. For the optical element surface Pe, the ridge portion of a unit rod-like prism was observed in a 3 mm-length area. For the back surface Pm, the surface was observed in a 9 mm$^2$ square area. The presence or absence of a scratch was determined by the observation.

To evaluate the scratch resistance of the back surface, i.e. the surface of a resin sheet in research 4, the presence or absence of a scratch was determined for 5 optical sheets after the vibration test in each of the Examples and Comp. Examples. The scratch resistance of the back surface was evaluated as "excellent" when no scratch was found in the back surfaces of all the 5 optical sheets, "poor" when a scratch was found in every one of the 5 optical sheets, and "good" when a scratch was found in some of the 5 optical sheets, but not found in the other sheet(s).

To evaluate the scratch resistance of the optical element surface, the presence or absence of a scratch was determined for 5 optical sheets after the vibration test in each of the Examples and Comp. Examples. The scratch resistance of the optical element surface was evaluated as "excellent" when no scratch was found in optical element surfaces of all the 5 optical sheets, "poor" when a scratch was found in every one of the 5 optical sheets, and "good" when a scratch was found in some of the 5 optical sheets, but not found in the other sheet(s).

[Performance Comparison]

Table 5 and FIG. 9 show data on the pencil hardnesses He and Hm and the scratch resistance, determined for the optical sheets of Examples D1 to D9 and Comp. Examples D1 to D4. In Table 5 and FIG. 9, the mark "O" in the column "Overall evaluation" indicates the case where the evaluation of the scratch resistance is "excellent" or "good" for the back surface Pm, and "excellent" for the optical element surface Pe; the mark "Δ" indicates the case where the evaluation of the scratch resistance is "excellent" or "good" for the back surface Pm, and "good" for the optical element surface Pe; and the mark "X" indicates the case where the evaluation of the scratch resistance is "poor" for at least one of the back surface Pm and the optical element surface Pe. The symbols N to Z in the column "Position on graph" in Table 5 indicate those symbols shown in FIG. 9. For example, the position "N" in Comp. Example D1, in which He=3B and Hm=2B, indicates the point N of the coordinates (3B, 2B) in FIG. 9.

TABLE 5

Evaluation of scratch resistance (vibration test) in relationship with pencil hardnesses He and Hm of optical element surface Pe and back surface Pm

| | Position on graph | Pencil hardness He | Pencil hardness Hm | Hm-He | Scratch resistance (vibration test) Optical element surface | Scratch resistance (vibration test) Back surface | Overall evaluation |
|---|---|---|---|---|---|---|---|
| Ex. D1 | O | 3B | B | +2 | excellent | good | ○ |
| Ex. D2 | P | 3B | HB | +3 | excellent | good | ○ |
| Ex. D3 | Q | 3B | F | +4 | good | excellent | Δ |
| Ex. D4 | R | 3B | H | +5 | good | excellent | Δ |
| Ex. D5 | S | 2B | HB | +2 | excellent | good | ○ |
| Ex. D6 | T | 2B | F | +3 | excellent | excellent | ○ |
| Ex. D7 | U | 2B | H | +4 | good | excellent | Δ |
| Ex. D8 | V | 2B | B | +1 | good | good | Δ |
| Ex. D9 | X | HB | HB | 0 | good | good | Δ |
| Comp. Ex. D1 | N | 3B | 2B | +1 | good | poor | X |
| Comp. Ex. D2 | W | 2B | 2B | 0 | good | poor | X |
| Comp. Ex. D3 | Y | HB | B | −1 | excellent | poor | X |
| Comp. Ex. D4 | Z | F | HB | −1 | excellent | poor | X |

Back surface Pm is the surface of body portion 1
"Hm-He" indicates a difference in hardness unit between Hm and He on the pencil hardness scale As shown in Table 5 and FIG. 9, the scratch resistance of the back surface Pm was found to be "poor" in Comp. Examples D3 and D4 in which the hardness Hm of the back surface Pm is lower than the hardness He of the optical element surface Pe. The scratch resistance of the back surface Pm was found to be "poor" in Comp. Examples D1 and D2 in which though the hardness Hm of the back surface Pm is not less than the hardness He of the optical element surface Pe, the hardness Hm of the back surface Pm is lower than "B". On the other hand, in Examples D1 to D9 which satisfy the requirements that the hardness Hm be not less than the hardness He (hardness Hm≥hardness He) and that the hardness Hm be not less than "B" (hardness Hm≥B), the scratch resistance of the back surface Pm was found to be at least "good" and the scratch resistance of the optical element surface Pe was found to be at least "good", and the overall evaluation was as fine as "○" or "Δ". In Examples D5, D8 and D9 in which the hardness Hm of the back surface Pm is not less than the hardness He of the optical element surface Pe, and the hardness Hm of the back surface Pm is not less than "B" and less than "F" (F>hardness Hm≥B), a scratch which was not considered to be practically problematic was found in the back surface(s) of one or two optical sheets.

In Examples D3, D4 and D7 in which the relation "hardness Hm−hardness He>3" holds true, a scratch which was not considered to be practically problematic was found in the optical element surface(s) Pe of one or two optical sheets. A scratch which was not considered to be practically problematic was found in the optical element surface(s) Pe of one or two optical sheets also in Examples D8 and D9 in which "hardness Hm−hardness He" is "1" or "0". On the other hand, in Examples D1, D2, D5 and D6 which satisfy the relation "hardness He+3≥hardness Hm≥hardness He+2", the scratch resistance of the optical element surface Pe was found to be "excellent".

What is claimed is:

1. An optical sheet comprising:
   a sheet-like body portion; and
   unit optical elements arranged on one surface of the body portion;
   wherein the optical sheet has a pair of opposite surfaces;
   wherein one of the pair of surfaces is configured as an optical element surface formed by the unit optical elements;
   wherein the optical element surface has a hardness He, and a back surface, defined by the other of the pair of surfaces, has a hardness Hm, which is not less than the hardness He, and wherein the hardness He and the hardness Hm are evaluated in terms of the pencil hardness measured in accordance with JIS K5600-5-4(1999), with a load of 1000 g and at a speed of 1 mm/s;
   wherein at least the optical element surface and the back surface are cured material of an ionizing radiation curable polymer; and
   wherein the hardness He and the hardness Hm satisfy the following relation:

hardness He +3 ≥hardness Hm ≥hardness He +2, wherein the expression "+1" indicates a hardness that is harder by one unit on the pencil hardness scale.

2. The optical sheet according to claim 1, wherein hardness Hm ≥F.

3. The optical sheet according to claim 2, further comprising a coating provided on the other surface of the body portion,
   wherein said back surface consists of the surface of the coating.

4. The optical sheet according to claim 3, wherein the refractive index Nm of a resin of the coating is lower than the refractive index Ns of a portion forming the other surface of the body portion.

5. The optical sheet according to claim 3, wherein the surface of the coating is an uneven surface having microprotrusions.

6. The optical sheet according to claim 3, wherein the surface of the coating is a smooth surface.

7. The optical sheet according to claim 1, wherein hardness Hm≥B.

8. The optical sheet according to claim 7, wherein said back surface consists of the other surface of the body portion.

9. The optical sheet according to claim 8, wherein said back surface is an uneven surface.

10. The optical sheet according to claim 8, wherein said back surface is a smooth surface.

11. An optical member comprising two optical sheets, each being the optical sheet according to claim 1,
    wherein the two optical sheets are stacked together such that they face in the same direction.

12. A surface light source device comprising a light source and the optical sheet according to claim 1.

13. A liquid crystal display device comprising:
    the surface light source device according to claim 12, and
    a transmission type liquid crystal display panel disposed opposite to the surface light source device.

* * * * *